(12) United States Patent
Saito et al.

(10) Patent No.: US 8,040,872 B2
(45) Date of Patent: Oct. 18, 2011

(54) FRAME FORWARDING APPARATUS

(75) Inventors: Toshiyuki Saito, Yokohama (JP);
Takaaki Toyama, Kawasaki (JP); Yu Mitsui, Fujisawa (JP); Munetoshi Tsuge, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 12/490,996

(22) Filed: Jun. 24, 2009

(65) Prior Publication Data

US 2010/0002702 A1    Jan. 7, 2010

(30) Foreign Application Priority Data

Jul. 7, 2008    (JP) ................................. 2008-177276

(51) Int. Cl.
*H04L 12/28*    (2006.01)

(52) U.S. Cl. ........ 370/351; 370/389; 370/390; 370/392; 370/395.31; 370/401

(58) Field of Classification Search .......................... None
See application file for complete search history.

(56) References Cited

U.S. PATENT DOCUMENTS

| | | | | |
|---|---|---|---|---|
| 6,006,258 | A * | 12/1999 | Kalajan ........................ | 709/219 |
| 6,157,635 | A * | 12/2000 | Wang et al. .................... | 370/352 |
| 6,304,908 | B1 * | 10/2001 | Kalajan ........................ | 709/229 |
| 7,333,488 | B2 * | 2/2008 | Sumiyoshi .................... | 370/390 |
| 7,424,024 | B2 * | 9/2008 | Chen et al. .................... | 370/401 |
| 7,680,106 | B2 * | 3/2010 | Satou ........................... | 370/389 |
| 7,769,008 | B2 * | 8/2010 | Sakamoto et al. ............. | 370/390 |
| 2005/0204062 | A1 | 9/2005 | Sekine et al. | |
| 2009/0080448 | A1 * | 3/2009 | Tarra et al. .................... | 370/401 |

FOREIGN PATENT DOCUMENTS

| | | |
|---|---|---|
| JP | 08-186569 | 7/1996 |
| JP | 2005-244603 | 9/2005 |
| WO | WO 03/073724 A | 9/2003 |

* cited by examiner

*Primary Examiner* — Ayaz Sheikh
*Assistant Examiner* — Blanche Wong
(74) *Attorney, Agent, or Firm* — McDermott Will & Emery LLP

(57) ABSTRACT

A MVAC spoofed frame or a loop frame generated by a user is prevented from obstructing communication and the source port ID of a fraud is reported to the network administrator. A MAC frame forwarding apparatus adds the input port ID and the source MAC address of a received frame. The MAC frame forwarding apparatus has a frame forwarding management table and a frame discarding management table. The frame discarding management table has a MAC address to be discarded, indicating a received frame to be discarded if the address matches the source MAC address of the received frame, a target port ID, and the number of discarded frames. A management apparatus discards a received frame if the source MAC address matches the MAC address to be discarded and counts the number of discarded frames. If the number of discarded frames exceeds a predetermined level, the port ID, the MAC address, and the number of discarded frames are reported to the management apparatus, and the source port of the fraud is reported to the administrator.

10 Claims, 24 Drawing Sheets

FRAME FORWARDING MANAGEMENT TABLE (2510)

| MAC ADDRESS (2511) | CONNECTION PORT ID (2512) |
|---|---|
| M1a | P1 |
| M1b | P1 |
| M1c | P1 |
| M2a | P2 |
| M3a | P3 |
| M3b | P3 |
| M3c | P3 |
| ... | ... |
| Mr | Pr |
| ... | ... |

FIG.3

FRAME DISCARDING MANAGEMENT TABLE 2520

| PORT ID /2521 | Index /2522 | MAC ADDRESS TO BE DISCARDED /2523 | DISCARDED FRAME COUNT /2524 |
|---|---|---|---|
| P1 | 1 | Mr | 0 |
|  | 2 | null |  |
|  | ... | ... | ... |
|  | j | null | 0 |
| P2 | 1 | Mr | 0 |
|  | 2 | null | 0 |
|  | ... | ... | ... |
|  | j | null | 0 |
| P3 | 1 | Mr | 0 |
|  | 2 | null | 0 |
|  | ... | ... | ... |
|  | j | null | 0 |
| ... | ... | ... | ... |
| Pr | 1 | null | 0 |
|  | 2 | null | 0 |
|  | ... | ... | ... |
|  | j | null | 0 |

FIG.4

DISCARDING NOTIFICATION PARAMETER TABLE (2530)

| EXAMPLE | DISCARDED FRAME COUNT MONITORING CYCLE /2531 | CYCLE CLEAR /2532 | DISCARDED FRAME COUNT THRESHOLD /2533 | REMARKS |
|---|---|---|---|---|
| (1) | 300 SECONDS | Disable | 100 | DISCARDED FRAME COUNT IS CHECKED ONCE IN 300 SECONDS. IF DISCARDED FRAME COUNT REACHES 100 OR MORE, NOTIFICATION IS MADE, THEN COUNT IS CLEARED TO ZERO. |
| (2) | 300 SECONDS | Enable | 100 | DISCARDED FRAME COUNT IS CHECKED ONCE IN 300 SECONDS, THEN COUNT IS CLEARED TO ZERO. (IF 100 OR MORE FRAMES ARE DISCARDED IN 300 SECONDS, NOTIFICATION IS MADE.) |
| (3) | ZERO SECONDS | Disable | 100 | IF DISCARDED FRAME COUNT REACHES 100 OR MORE, NOTIFICATION IS MADE, THEN COUNT IS CLEARED TO ZERO. |

FIG.5

FRAME FORWARDING MANAGEMENT TABLE (2510)

| MAC ADDRESS (2511) | CONNECTION PORT ID (2512) | AGING EXEMPT SETTING (2513) |
|---|---|---|
| M1a | P1 | 0 |
| M1b | P1 | 0 |
| M1c | P1 | 0 |
| M2a | P2 | 0 |
| M3a | P3 | 0 |
| M3b | P3 | 0 |
| M3c | P3 | 0 |
| ... | ... | ... |
| Mr | Pr | 1 (AGING EXEMPT) |
| ... | ... | ... |

FIG.12

| VLANID | MAC ADDRESS | CONNECTION PORT ID |
|---|---|---|
| VID1 | M1a | P1 |
| VID2 | M2a | P2 |
| VID3 | M3c | P3 |
| ... | ... | ... |
| VID1 | Mr | Pr |
| VID2 | Mr | Pr |
| VID3 | Mr | Pr |
| ... | ... | ... |

FIG.22

FRAME DISCARDING MANAGEMENT TABLE (2520)

| PORT NUMBER | Index | VLANID | MAC ADDRESS TO BE DISCARDED | DISCARDED FRAME COUNT |
|---|---|---|---|---|
| P1 | 1 | VID1 | Mr | 0 |
|  | 2 | null | null |  |
|  | ... | ... | ... | ... |
|  | j | null | null | 0 |
| ... | ... | ... | ... | ... |
| Pr | 1 | null | null | 0 |
|  | 2 | null | null | 0 |
|  | ... | ... | ... | ... |
|  | j | null | null | 0 |

FIG.23

HIGH-PRIORITY LEARNING PORT SPECIFICATION TABLE (2540)

| PORT ID (2541) | VLANID (2543) | HIGH-PRIORITY LEARNING FLAG (2542) |
|---|---|---|
| P1 | VID1 | 0 |
|  | VID2 | 0 |
|  | ... | 0 |
| P2 | VID1 | 0 |
|  | VID2 | 0 |
|  | ... | ... |
| ... | ... | ... |
| Pr | VID1 | 1 (PRIORITY) |
|  | VID2 | 1 (PRIORITY) |
|  | ... | 0 |
|  | ... | 0 |
|  | VID4095 | 0 |

FIG.24

FRAME FORWARDING APPARATUS

CLAIM OF PRIORITY

The present application claims priority from Japanese patent application JP 2008-177276 filed on Jul. 7, 2008, the content of which is hereby incorporated by reference into this application.

BACKGROUND OF THE INVENTION

1. Field of the Invention

The present invention relates to frame forwarding apparatuses, and more specifically, to a frame forwarding apparatus which sets up the discarding of a frame, makes a discarding notification, and forwards a frame, in a system for forwarding frames in accordance with their media access control (MAC) addresses.

2. Description of the Related Art

A layer-2 switch device which forwards a frame in accordance with its MAC address generally contains a forwarding table that includes a combination of a MAC address and a port ID of a port having a device with the MAC address. When a MAC frame is received, the forwarding table is searched for the destination MAC address of the frame. If there is a hit, the frame is forwarded to the corresponding port. If the matching port is the receiving port of the frame (if the destination port matches the receiving port), the frame is discarded. If there is no hit, the frame is forwarded to all ports except the receiving port. The forwarding of a frame to all ports except the receiving port when the destination MAC address is not found is called flooding. Flooding is not always forwarding to all ports. Flooding can also be made to ports specified as a group such as those in a virtual LAN.

An entry can be added to the forwarding table in several ways. When a MAC frame is received, the source MAC address of the frame and the receiving port of the frame can be automatically entered (MAC automatic learning). The administrator can add them by entering a command or the like. If automatic learning is used, since the number of entries in the forwarding table is finite, MAC addresses must be deleted and replaced. Accordingly, MAC automatic learning is used often with automatic deletion of a MAC address that is not accessed for a predetermined period of time. The deletion of the address that has not been accessed for the predetermined period of time is called aging.

Access networks have been gaining high-speed broadband capabilities, and an increasing number of IP networks have been introduced. In that environment, a network failure can be caused by a spoofed frame given by an unauthorized user, a denial-of-service attack (DoS attack), or a computer virus. A loop frame generated by a wrong connection or a wrong setting performed by the user, a fraudulent frame, or a spoofed frame can also cause a network failure.

One known method of preventing those failures uses a flag in the forwarding table of the layer-2 switch device, for instance. The administrator specifies the MAC address to be discarded in a network apparatus in advance, and if the destination or source MAC address of a received MAC frame matches the specified MAC address, the frame is discarded. In another known method, an access permission table is provided in the apparatus, and the administrator specifies a desired forwarding MAC address. If the destination or source MAC address of a received MAC frame matches the specified address, the frame is transferred.

In one known monitoring method (refer to Japanese Unexamined Patent Application Publication No. Hei-8-186569, for instance), combinations of a MAC address and an IP address are listed. The presence of a fraudulent terminal or a fraudulent frame is monitored by checking whether the combination of the source or destination MAC address and the IP address of a received frame is found in the list. Another known method (refer to Japanese Unexamined Patent Application Publication No. 2005-244603, for instance) analyzes protocol data of layer 3 or above (DHCP message, for instance), holds the combination of the MAC address and the IP address in a table, and discards a received frame if the combination of the source or destination MAC address and the IP address of the received frame does not match any combination in the table.

SUMMARY OF THE INVENTION

If a malicious user sends a fraudulent frame with a spoofed source MAC address, the forwarding table in the MAC frame forwarding apparatus would learn the spoofed frame automatically and would output the frame to a wrong port. This could obstruct correct communication. If a loop is formed on the side of the user network by a mistake of the user, the loop frame would be automatically learned, and correct communication could be obstructed here as well. If the loop is formed, the loop frame would increase traffic, using up the band and obstructing normal communication. If MAC automatic learning of ports connected to the user network is simply disabled, all frames passing the MAC frame forwarding apparatus would be flooded, lowering the communication band efficiency.

The method disclosed in Japanese Unexamined Patent Application Publication No. Hei-8-186569 just monitors the presence of a fraudulent terminal and does not discard a fraudulent frame. Since the combination of the MAC address and the IP address is monitored, a combination of a spoofed MAC address and a spoofed IP address or a loop frame cannot be detected. The method disclosed in Japanese Unexamined Patent Application Publication No. 2005-244603 can discard a fraudulent frame having a wrong combination of a MAC address and an IP address, but cannot detect a frame having a spoofed MAC address and a spoofed IP address or a loop frame.

In the network management, a fraudulent frame must be discarded, and a source location of a fraud must be identified and corrected rapidly. Actually, it is difficult to locate a fraud. In one countermeasure, frames passing through the network are captured and analyzed manually to detect an unusual frame. This method has placed a burden on the administrator.

Accordingly, it is an object of the present invention to provide a frame forwarding apparatus, such as a MAC frame forwarding apparatus, which prevents communication from being obstructed by a spoofed frame or a loop frame provided by the user and reports the port ID of the location of the problem to the network administrator.

To achieve the above-described object, the present invention provides a MAC frame forwarding apparatus for controlling MAC frame forwarding between each user terminal and a wide area network, and the frame forwarding apparatus includes a plurality of first interface units each accommodating an access channel connected to at least one user terminal, a second interface unit connected to the wide area network, and a control unit. The control unit has a table which saves the MAC address of a user terminal or a wide area network apparatus and a connection port ID identifying the first or second interface unit connected to the terminal or the network apparatus, in association with each other; a table which saves a MAC address to be discarded, which indicates that a received frame having the address as a source MAC address will be discarded, and a target port ID; a table which counts the number of discarded frames; and a means for communicating with a management apparatus that manages the MAC frame forwarding apparatus. If the source MAC address of a received frame matches the MAC address to be discarded, the frame is discarded, and the number of discarded frames is counted. If the number of discarded frames exceeds a predetermined level, the port ID, the MAC address, and the number of discarded frames are reported to the management apparatus.

According to the solving means of the present invention, there is provided a frame forwarding apparatus for controlling frame forwarding between each user terminal and a network, the frame forwarding apparatus comprising:

a plurality of first interface units each accommodating an access channel connected to at least one user terminal;

a second interface unit connected to the network;

a frame forwarding management table which saves the address of each user terminal or a network apparatus and a connection port ID associated with the address, the connection port ID identifying the first or second interface unit connected to the terminal or the network apparatus;

a frame discarding management table which saves an address to be discarded, a target port ID, and the number of discarded frames in association with one another, the address to be discarded indicating that a received frame having the address as a source address will be discarded;

a frame forwarding control processing unit for receiving, forwarding, or discarding a frame with reference to the frame forwarding management table and the frame discarding management table; and a processor for executing a table management process for the frame forwarding management table and the frame discarding management table, as prescribed by a management apparatus;

the frame forwarding control processing unit receiving a frame from the first or second interface unit;

searching an address-to-be-discarded column in the frame discarding management table for the source address of the received frame;

if the source address is found, discarding the received frame and incrementing the corresponding number of discarded frames in the frame discarding management table;

if the source address of the received frame is not found in the address-to-be-discarded column in the frame discarding management table, searching an address column and a connection port ID column in the frame forwarding management table for a combination of the source address of the received frame and the connection port ID, and, if the combination is not found, adding the source address of the received frame and the receiving port ID to the address column and the connection port ID column of the frame forwarding management table; and searching the address column of the frame forwarding management table for the destination address of the received frame, if the address is found, forwarding the frame to the port found in the corresponding connection port ID field, and, if the address is not found, flooding the frame to ports except the receiving port of the received frame.

According to the present invention, a frame forwarding apparatus such as a MAC frame forwarding apparatus (or a frame forwarding system including a PON system) can discard a loop frame or a spoofed frame and can prevent a network failure from occurring. The source port of the problem, the corresponding source MAC address, and the number of discarded frames are reported to a management apparatus, making it easier to analyze the failure.

BRIEF DESCRIPTION OF THE DRAWINGS

FIG. 3 shows the structure of a frame forwarding management table 2510 in the first embodiment.

FIG. 4 shows the structure of a frame discarding management table 2520 in the first embodiment.

FIG. 5 shows the structure of a discarding notification parameter table 2530 in the first embodiment.

FIG. 12 shows the structure of a frame forwarding management table 2510 in a second embodiment.

FIG. 22 shows the structure of a frame forwarding management table 2510 in a fourth embodiment.

FIG. 23 shows the structure of a frame discarding management table 2520 in the fourth embodiment.

FIG. 24 shows the structure of a high-priority learning port specification table 2540 in the fourth embodiment.

DESCRIPTION OF THE PREFERRED EMBODIMENTS

Embodiments of the present invention will be described below with reference to the drawings.

1. First Embodiment

Hardware Structure

Figure 1:
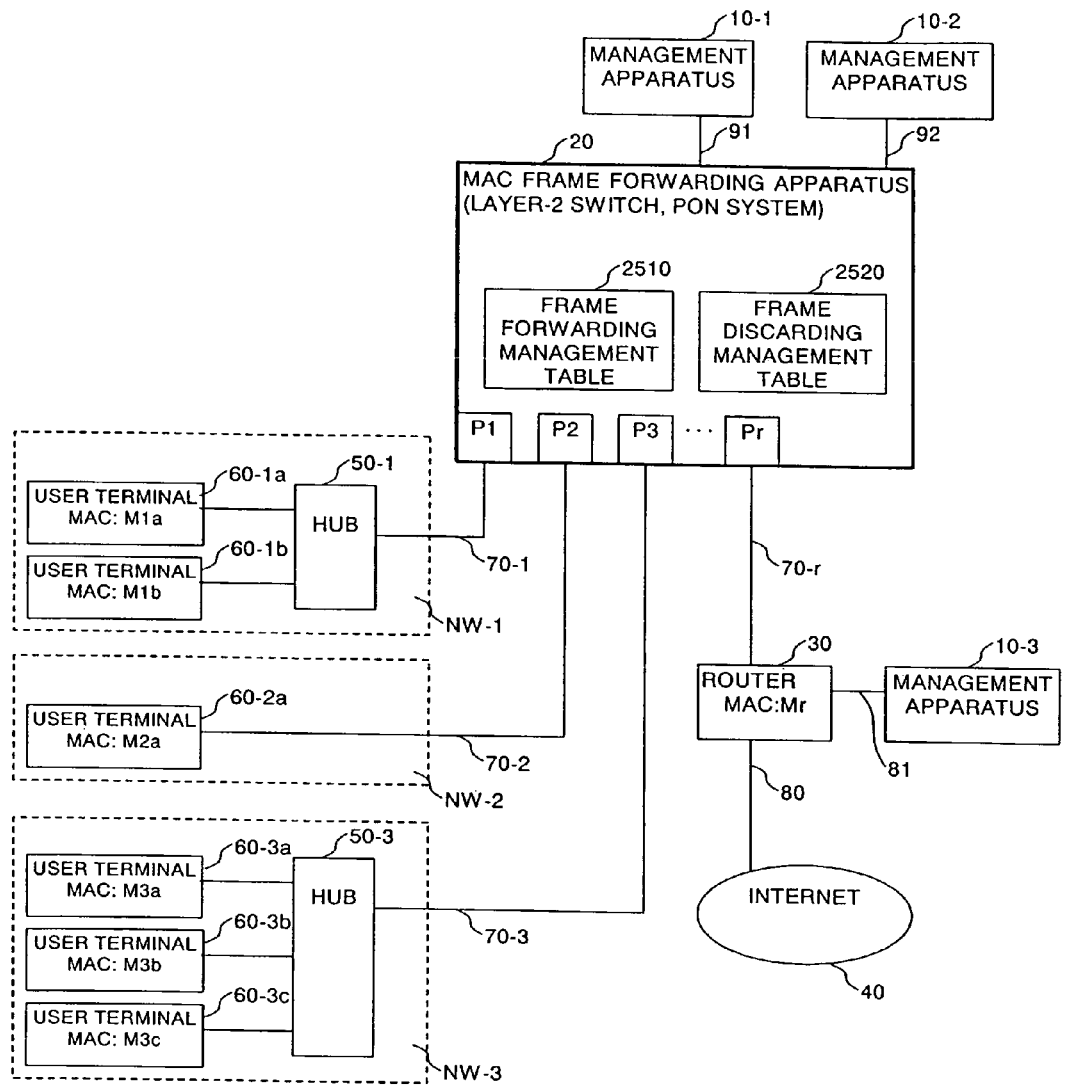
FIG. 1 shows the structure of a network system that includes a MAC frame forwarding apparatus according to a first embodiment.

FIG. 1 shows the structure of a network system that includes a MAC frame forwarding apparatus 20 according to a first embodiment.

The shown network system includes the MAC frame forwarding apparatus 20, a plurality of user terminals 60-1a to 60-3c, and management apparatuses 10-1 to 10-3, and is connected to the Internet 40 through a router 30.

There are two types of user terminal networks. One type of a user terminal network has a plurality of user terminals 60 connected through a user premises hub 50 to the MAC frame forwarding apparatus 20, as user terminal networks NW-1 and NW-3 shown in the figure in which a plurality of user terminals 60-1a and 60-1b and 60-3a to 60-3c are connected to the MAC frame forwarding apparatus 20 through user premises hubs 50-1 and 50-2. Another type of a user terminal network has a user terminal 60 directly connected to the MAC frame forwarding apparatus 20, just by an access channel 70, as a user terminal network NW-2 shown in the figure in which a user terminal 60-2a is directly connected to the MAC frame forwarding apparatus 20 by an access line 70-2. A home router may be disposed in place of the user terminal 60 or the user premises hub 50 to connect a plurality of user terminals, not shown, to the MAC frame forwarding apparatus 20. Alternatively, another MAC frame forwarding apparatus 20 may be disposed in place of the user terminal 60 or the user premises hub 50 to make a cascade connection to the MAC frame forwarding apparatus 20. In the subsequent description, the user terminal 60 or the user terminal network NW includes a home router or a MAC frame forwarding apparatus 20.

In the MAC frame forwarding apparatus 20, different IDs, from P1 to Pr, are assigned to input-output ports accommodating access channels 70-1 to 70-3 connected to the user networks and an access channel 70-r connected to a wide area network such as the Internet.

The management apparatuses 10-1 to 10-3 perform management operations such as setting up and monitoring the MAC frame forwarding apparatus 20 and other apparatuses in the system. The management apparatuses 10-1 to 10-3 are connected by a channel 91 such as a serial cable, a management network channel 92, or a wide area network channel 81 through the router 30. FIG. 1 shows a plurality of management apparatuses 10. The system may also be structured to connect several types of channels or a single type of channels by a single management apparatus.

The user terminal 60 or the router 30 sends or forwards a MAC frame for communication. The MAC frame forwarding apparatus 20 includes a frame forwarding management table 2510 and a frame discarding management table 2520, analyzes a received MAC frame, and forwards or discards the MAC frame with reference to the tables.

Figure 2:
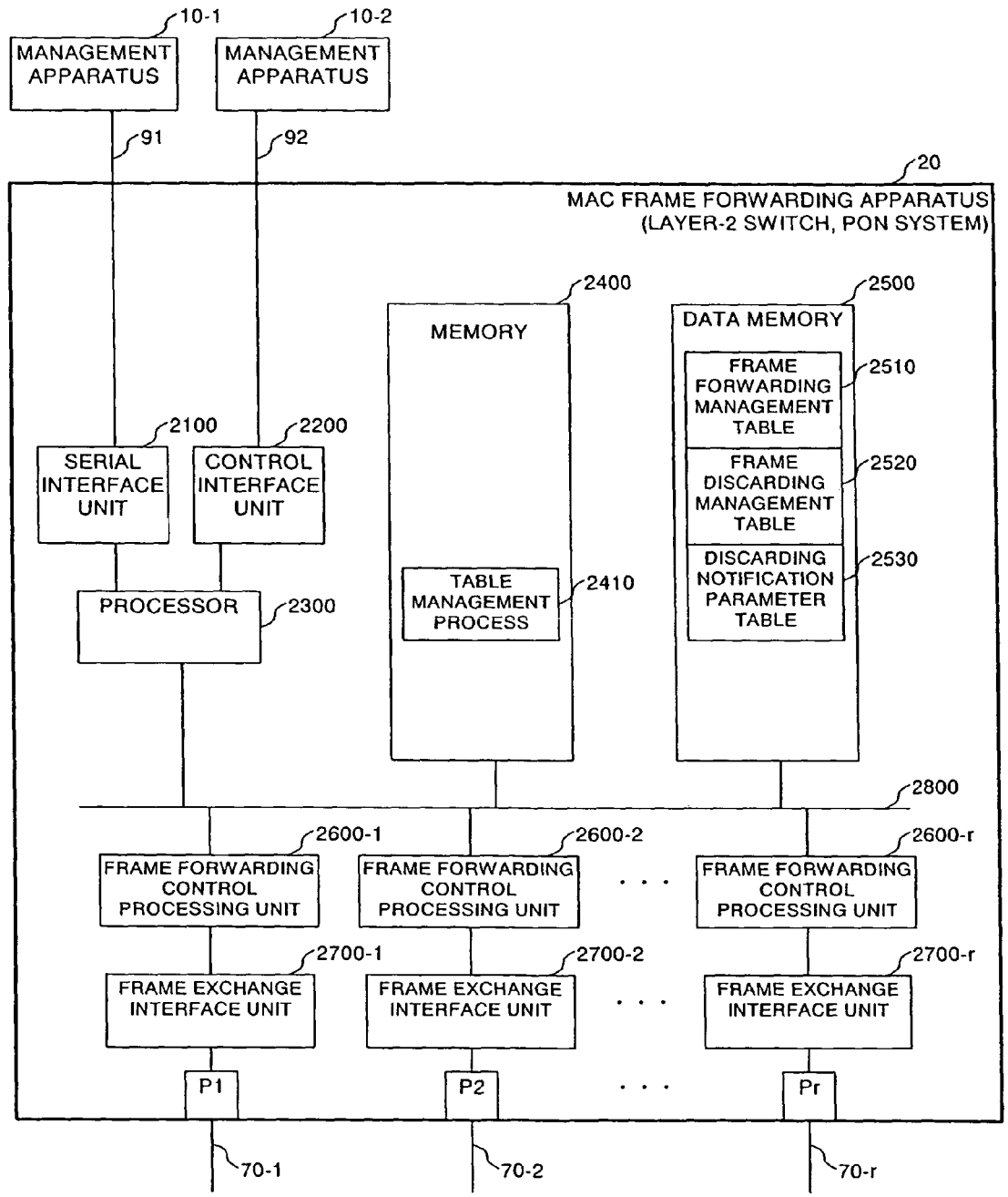
FIG. 2 is a block diagram showing the MAC frame forwarding apparatus in the first embodiment.

FIG. 2 is a block diagram showing the MAC frame forwarding apparatus 20 in the first embodiment.

The shown MAC frame forwarding apparatus 20 has a serial interface unit 2100 for connecting the management apparatus 10, a control interface unit 2200, a processor 2300, a memory 2400 storing various programs to be executed by the processor 2300, a data memory 2500, a frame forwarding control processing units 2600 (2600-1 to 2600-r), frame exchange interface units 2700 (2700-1 to 2700-r) accommodating access channels, and an internal bus 2800 connecting those elements.

The frame exchange interface units 2700-1 to 2700-r are connected to different access channels 70-1 to 70-r shown in FIG. 1 and are given different port IDs. A signal received from the access channel 70 is processed by the corresponding frame exchange interface unit 2700, converted to a received frame, and passed to the corresponding frame forwarding control processing unit 2600. The frame forwarding control processing unit 2600 forwards or discards the frame in accordance with a processing sequence, which will be described later. The processor 2300 performs a table management process 2410 by loading it from the memory 2400 or the like. The table management process 2410 manages tables on the data memory 2500 according to instructions sent from the management apparatus 10 or the like.

Memory Structure

FIG. 3 shows an example structure of the frame forwarding management table 2510 in the first embodiment. The frame forwarding management table 2510 is used to determine a destination port of a received frame in the first embodiment.

The frame forwarding management table 2510 shown in FIG. 3 has a MAC address column 2511 and a connection port ID column 2512. The source MAC address of the received frame is provided in the MAC address column 2511, and the corresponding input (source) port ID is provided in the connection port ID column 2512. The port ID indicates the port to which the terminal having the MAC address is connected.

When a frame is received, the frame forwarding management table 2510 is searched for the destination MAC address of the received frame. If there is a hit, the frame is sent (forwarded) to the port indicated by the port ID found in the connection port ID column 2512.

FIG. 4 shows an example structure of the frame discarding management table 2520 in the first embodiment. The frame discarding management table 2520 has the MAC address to be discarded and the number of frames discarded in accordance with the MAC address in the first embodiment.

The frame discarding management table 2520 shown in FIG. 4 has a port ID column 2521, an index column 2522 of each port ID, a MAC-address-to-be-discarded column 2523, and a discarded frame count column 2524. The index is a number given naturally (or automatically) by the hardware, for instance.

A source MAC address of a received frame to be discarded is put in the MAC-address-to-be-discarded column 2523. The number of frames discarded in accordance with the specified MAC address is provided in the discarded frame count column 2524. The number of frames discarded in accordance with each MAC address to be discarded is counted for each port ID. Therefore, the number of frames that have been discarded can be obtained for each port ID and each MAC address.

The example shown in FIG. 4 has the port ID column 2521 and the index column 2522. If they are associated with a memory address, the port ID column 2521 and the index column 2522 can be eliminated.

FIG. 5 shows an example structure of a discarding notification parameter table 2530 in the first embodiment. The discarding notification parameter table 2530 has information set to notify the management apparatus 10 of the discarding of a MAC frame in the first embodiment.

The discarding notification parameter table 2530 shown in FIG. 5 has a discarded frame count monitoring cycle column 2531, a cycle clear column 2532, and a discarded frame count threshold value 2533.

A cycle on which the frame discarding management table 2520 is monitored is given in the discarded frame count monitoring cycle column 2531. A setting indicating whether the discarded frame count column 2524 in the frame discarding management table 2520 is cleared on each monitoring cycle is specified in the cycle clear column 2532. A threshold to be compared with the discarded frame count in the discarded frame count column 2524 of the frame discarding management table 2520 is specified in the discarded frame count threshold value column 2533. If the threshold is exceeded, the fact is reported to the management apparatus 10.

FIG. 5 shows three different settings (1) to (3).

The setting (1) means the following: The discarded frame count is checked once in 300 seconds; when the discarded frame count of a certain MAC address under a certain port in the discarded frame count column 2524 reaches 100 or more, the fact is reported to the management apparatus 10; and then, the discarded frame count of the MAC address under the port in the discarded frame count column 2524 is cleared.

The setting (2) means the following: The discarded frame count is checked once in 300 seconds, and the discarded frame count column 2524 is cleared at intervals of 300 seconds. When a hundred or more frames are discarded in 300 seconds, the fact is reported to the management apparatus 10.

The setting (3) means that monitoring is made not on a temporal cycle but on a process cycle of the table management process 2410, which will be described below. When the discarded frame count at a certain MAC address under a port in the discarded frame count column 2524 reaches 100 or more, the fact is reported to the management apparatus 10, and then, the discarded frame count is cleared.

Flowchart

The operation in the first embodiment will be described next.

Figure 6:
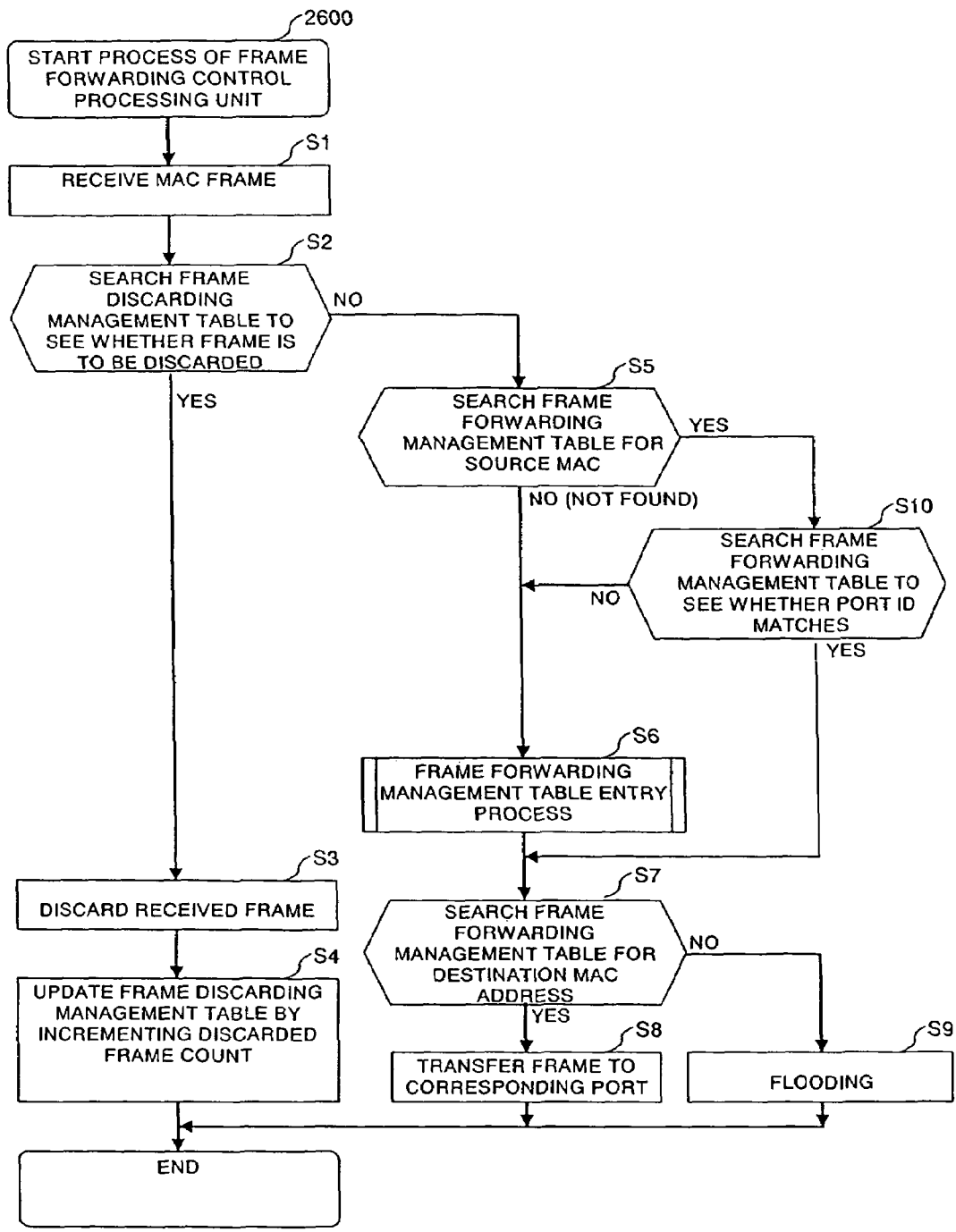
FIG. 6 is a flowchart illustrating the operation of a frame forwarding control processing unit 2600 in the first embodiment.

FIG. 6 is a flowchart illustrating an operation of the frame forwarding control processing unit 2600 in the first embodiment. The operation of the frame forwarding control processing unit 2600 includes receiving, forwarding, and discarding a MAC frame and adding an entry to the frame forwarding management table 2510.

The frame forwarding control processing unit 2600 receives a MAC frame from the frame exchange interface unit 2700 (S1 in FIG. 6) and searches the MAC-address-to-be-discarded column 2523 of the frame discarding management table 2520 for the source MAC address of the received frame (S2). If the address is found (Yes in S2), the frame forwarding control processing unit 2600 discards the received frame (S3), increments the number of discarded frames in the corresponding field of the frame discarding management table 2520 (S4), and ends the process.

If the address is not found (No in S2), the frame forwarding control processing unit 2600 searches the MAC address column 2511 of the frame forwarding management table 2510 for the source MAC address of the received frame (S5).

If the address is not found (No in S5), the frame forwarding control processing unit 2600 adds an entry to the frame forwarding management table 2510 (S6) and the operation goes to step S7. If the address is found (Yes in S5), the frame forwarding control processing unit 2600 checks whether the current port in the connection port ID column 2512 of the frame forwarding management table 2510 matches the current receiving port (S10).

If the receiving port is different (No in S10), the operation goes to step S6, in the same way as after the judgment in step S5 is No. If the receiving port is the same (Yes in S10), the operation goes to step S7.

In step S7, the frame forwarding control processing unit 2600 searches the MAC address column 2511 of the frame forwarding management table 2510 for the destination MAC address of the received frame (S7). If the address is found (Yes in S7), the frame forwarding control processing unit 2600 forwards the frame to the corresponding port specified in the connection port ID column 2512 (S8), and ends the process. If the address is not found (No in S7), the frame forwarding control processing unit 2600 performs flooding to ports except the receiving port, since the destination port is not known (S9), and ends the process.

Figure 7:
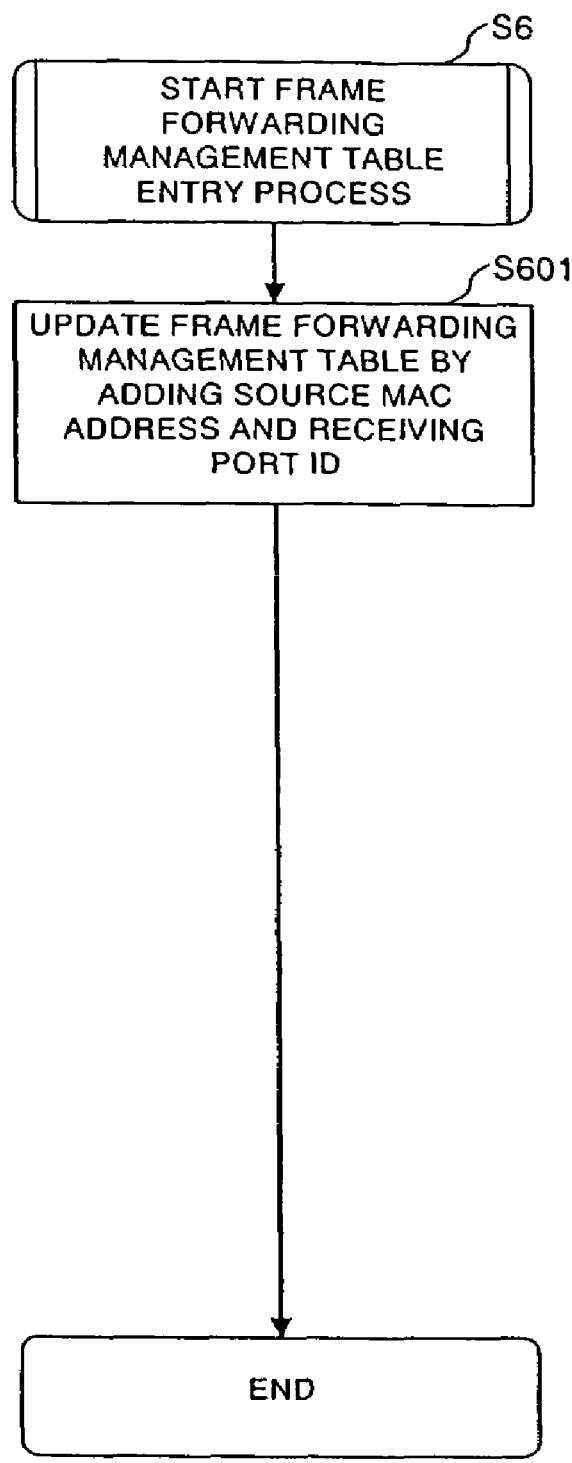
FIG. 7 is a flowchart illustrating a frame forwarding management table entry process (S6) in the first embodiment.

FIG. 7 is a flowchart illustrating the frame forwarding management table entry process (S6) in FIG. 6.

In the frame forwarding management table entry process (S6), the frame forwarding control processing unit 2600 puts the source MAC address and the receiving port ID of the received frame in the MAC address column 2511 and the connection port ID column 2512 of the frame forwarding management table 2510 (S601 in FIG. 7), and ends the process.

Since the MAC address and the port ID are added to the frame forwarding management table 2510, if a frame received later has the destination MAC address matching the MAC address added here, the frame is forwarded (sent) to the corresponding port, and flooding is not performed.

Figure 8:
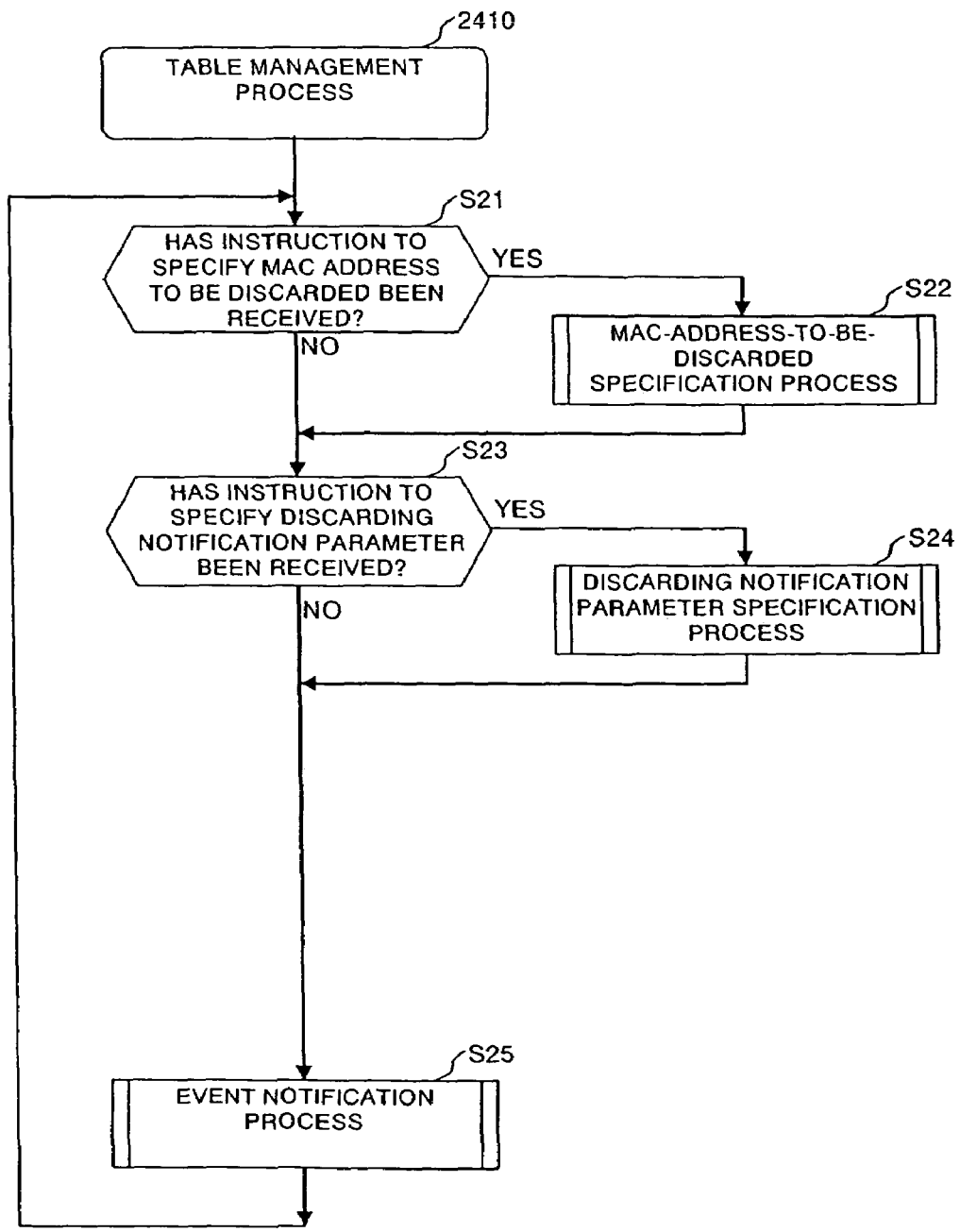
FIG. 8 is a flowchart illustrating a table management process 2410 in the first embodiment.

FIG. 8 is a flowchart illustrating the table management process 2410 in the first embodiment. By executing the table management process 2410, the processor 2300 sets the frame discarding management table 2520 and the discarding notification parameter table 2530 and makes a notification to the management apparatus 10.

The processor 2300 executes the table management process 2410 to check whether an instruction to specify a MAC address to be discarded has been received from the management apparatus 10 (S21 in FIG. 8). In the first embodiment, a known technology can be used for the instruction from the management apparatus 10. For example, the MAC frame forwarding apparatus 20 is accessed through a serial interface or by a Telnet or HTTP connection, and a command line interface (CLI) command or a graphic user interface (GUI) may be used. Alternatively, a Simple Network Management Protocol (SNMP) command or a Transaction Language One (TL-1) command may be used. Those methods may also be combined.

Data specified in the instruction to specify the MAC address to be discarded should include a target port ID, a MAC address to be discarded, and a choice of addition or deletion. The data can be either text or codes. When an instruction to specify the MAC address to be discarded is received from the management apparatus 10 (Yes in S21), the processor 2300 performs a MAC-address-to-be-discarded specification process (S22), which will be described later.

Then, the processor 2300 checks whether an instruction to specify a discarding notification parameter has been received from the management apparatus 10 (S23). In the first embodiment, a known technology can be used for the instruction from the management apparatus 10. The data specified in the instruction to specify a discarding notification parameter should include a discarded frame count monitoring cycle, a cycle clear setting, or a discarded frame count threshold value, or all of those items. The data can be either text or codes.

When an instruction to specify a discarding notification parameter is received from the management apparatus 10 (Yes in S23), the processor 2300 performs a discarding notification parameter specification process (S24), which will be described later. The processor 2300 next performs an event notification process (S25), which will be described later, and returns to the step of checking whether an instruction to specify the MAC address to be discarded has been received (S21 in FIG. 8), and repeats the process.

Figure 9:
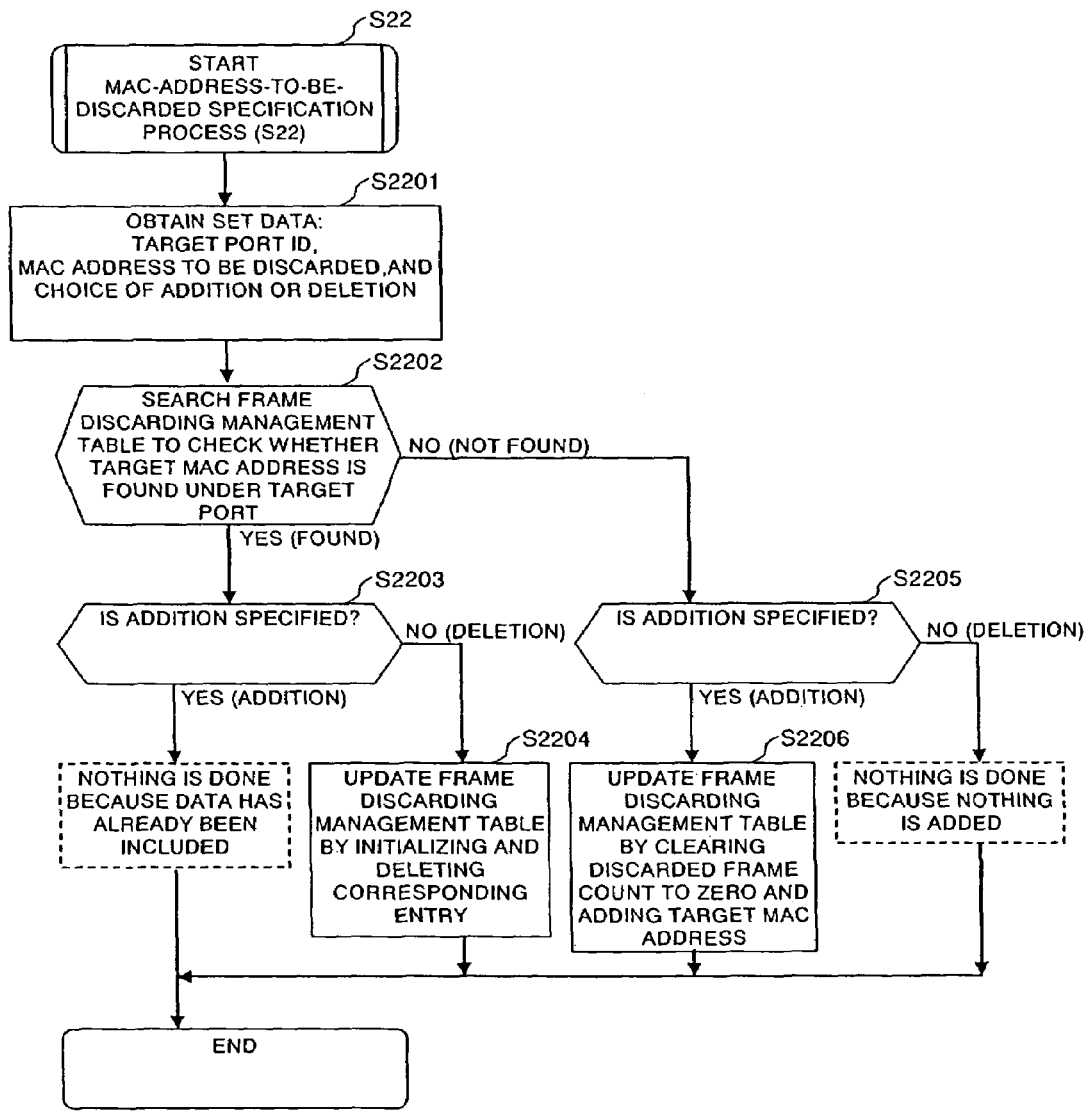
FIG. 9 is a flowchart illustrating a MAC-address-to-be-discarded specification process (S22) in the first embodiment.

FIG. 9 is a flowchart illustrating the MAC-address-to-be-discarded specification process (S22) in FIG. 8.

The processor 2300 starts the MAC-address-to-be-discarded specification process (S22), obtains the set data, which is the target port ID, the MAC address to be discarded, and a choice of addition or deletion (S2201), and searches the port ID column 2521 and the MAC-address-to-be-discarded column 2523 of the frame discarding management table 2520 for the combination of the target port and the MAC address to be discarded (S2202).

If the MAC address to be discarded is found (Yes in S2202), the processor 2300 next checks whether addition is specified (S2203). If addition is specified (Yes in S2203), the processor 2300 ends the process because the data has already been specified. If deletion is specified (No in step S2203), the processor 2300 deletes the entry by initializing the corresponding values in the discarded frame count column 2524 and the MAC-address-to-be-discarded column 2523 of the frame discarding management table 2520 (S2204), and ends the process.

If the MAC address to be discarded is not found (No in S2202), the processor 2300 checks whether addition is specified (S2205). If addition is specified (Yes in S2205), the processor 2300 initializes (clears to zero) the corresponding value in the discarded frame count column 2524 of the frame discarding management table 2520, adds the specified MAC address specified under the target ID in the MAC-address-to-be-discarded column 2523 (S2206), and ends the process. The index in the index column 2522 can be assigned automatically by the processor 2300 in accordance with a predetermined rule, setting, method, or the like. If deletion is specified (No in S2205), the processor 2300 ends the process because the data has already been deleted (not added).

Figure 10:
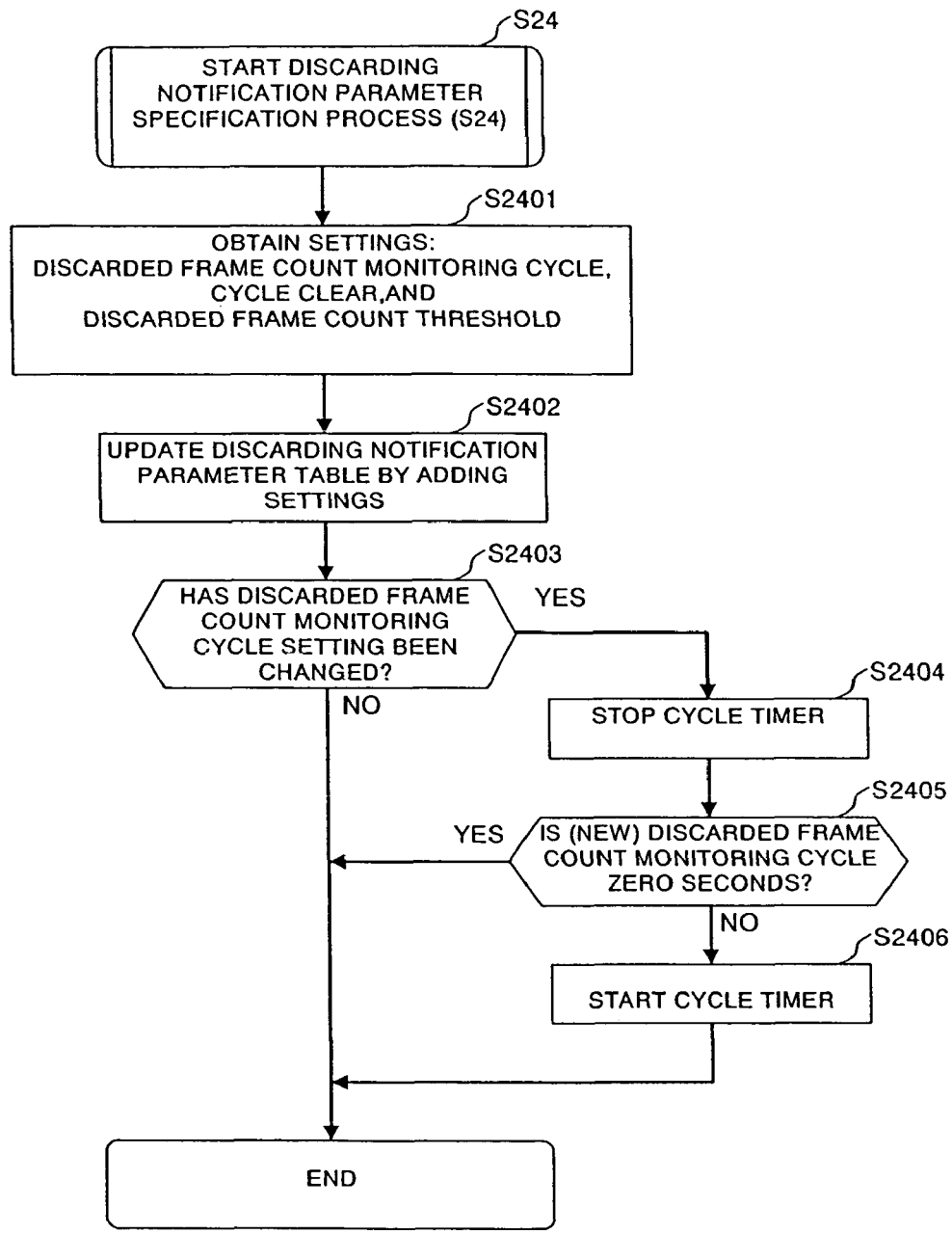
FIG. 10 is a flowchart illustrating a discarding notification parameter specification process (S24) in the first embodiment.

FIG. 10 is a flowchart illustrating the discarding notification parameter specification process (S24) in FIG. 8.

The processor 2300 starts the discarding notification parameter specification process (S24), obtains the set data, which is the discarded frame count monitoring cycle, the cycle clear setting, and the discarded frame count threshold value (S2401), and specifies the data in the discarding notification parameter table 2530 as prescribed (S2402). The processor 2300 next checks whether the setting in the discarded frame count monitoring cycle column 2531 has been changed (S2403). If there is no change (No in S2403), the processor 2300 ends the process. If there is a change (Yes in S2403), the processor 2300 stops a cycle timer (S2404) and checks whether the new discarded frame count monitoring cycle is zero seconds (no monitoring depending on a temporal cycle) (S2405). If the setting is zero seconds (Yes in S2405), the processor 2300 ends the process. Otherwise (No in S2405), the processor 2300 starts the cycle timer with a new cycle (S2406), and ends the process.

Figure 11:
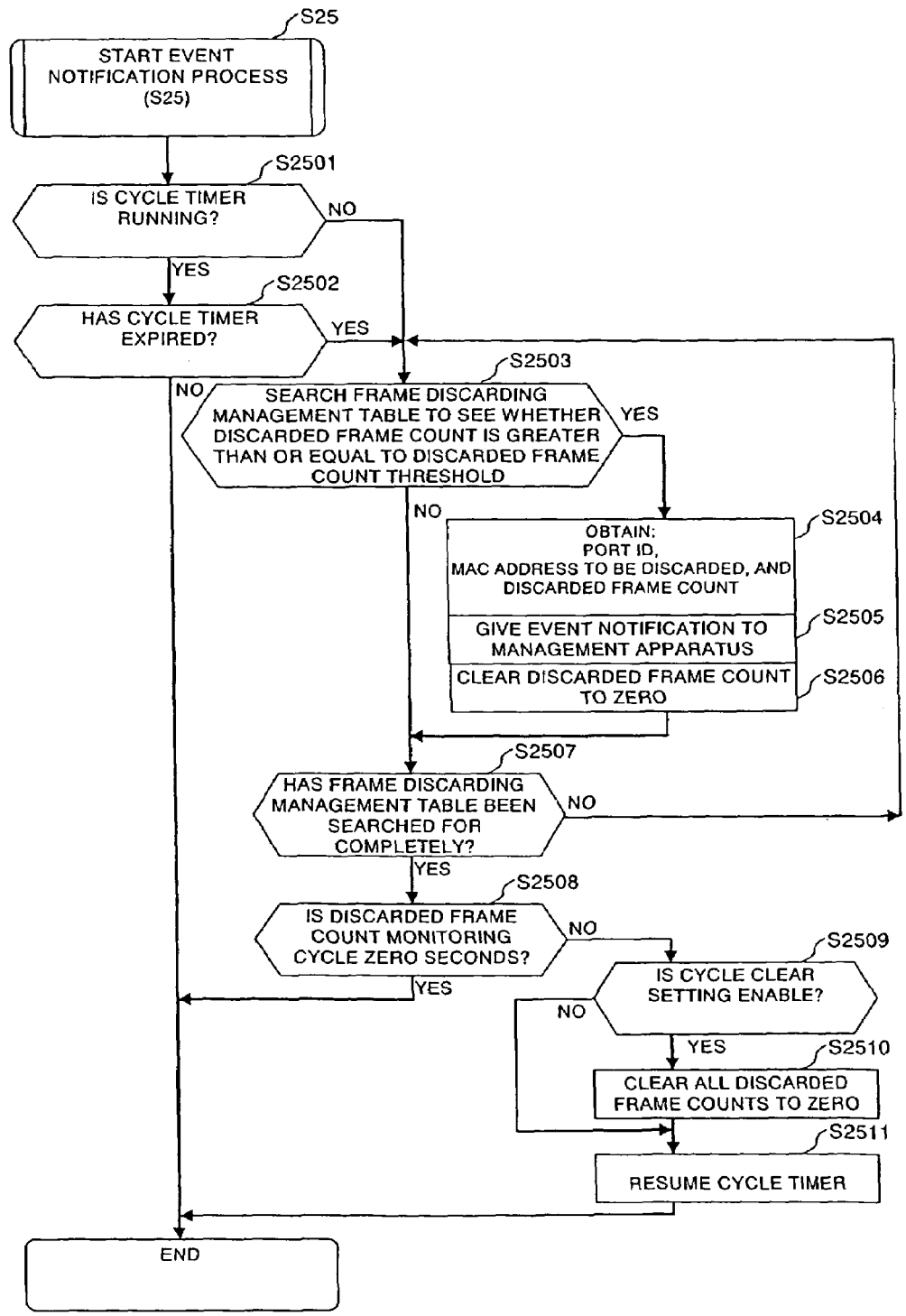
FIG. 11 is a flowchart illustrating an event notification process (S25) in the first embodiment.

FIG. 11 is a flowchart illustrating the event notification process (S25) in FIG. 8.

The processor 2300 starts the event notification process (S25) and checks whether the cycle timer is running (S2501). If the cycle timer is running (Yes in S2501), the processor 2300 checks next whether the cycle timer has expired (S2502). If the cycle has not expired (No in S2502), the processor 2300 ends the process. If the cycle timer has expired (Yes in S2502) or if the cycle timer is at rest (No in S2501), the processor 2300 checks whether the discarded frame count in the discarded frame count column 2524 of the frame discarding management table 2520 is greater than or equal to the discarded frame count threshold value 2533 in the discarding notification parameter table 2530 (S2503).

If the count is greater than or equal to the threshold (Yes in S2503), the processor 2300 obtains the port ID, the MAC address to be discarded, and the discarded frame count from the corresponding fields in the frame discarding management table 2520 (S2504), gives the management apparatus 10 an event notification that includes the port ID, the MAC address to be discarded, and the discarded frame count (S2505), and clears the corresponding field in the discarded frame count column 2506 of the frame discarding management table 2520 to zero (S2506). In the first embodiment, a known technology can be used to make a notification to the management apparatus 10. For example, the notification may be output on the screen while the MAC frame forwarding apparatus 20 is being accessed by a serial interface or by a Telnet or HTTP connection. The notification may also be made by a trap of the Simple Network Management Protocol (SNMP), by email, by a lamp, or by a combination of those methods. The notified data should include a port ID, a MAC address to be discarded, and a discarded frame count, and can be text or code data (a bit string, a lamp on/off state, or a 7-segment LED state).

The processor 2300 next determines whether all the entries of the frame discarding management table 2520 have been checked (S2507). If not all the entries have been checked (No in S2507), the processor 2300 returns to step S2503 and repeats the process. If all the entries have been checked (Yes in S2507), the processor 2300 checks whether the discarded frame count monitoring cycle in the discarding notification parameter table 2530 is zero seconds (no monitoring depending on a temporal cycle) (S2508).

If the setting is zero seconds (Yes in S2508), the processor 2300 ends the process. Otherwise (No in S2508), the processor 2300 checks whether the setting in the cycle clear column 2532 of the discarding notification parameter table 2530 is Enable (S2509).

If Enable is found (Yes in S2509), the processor 2300 clears all entries of the discarded frame count column 2524 in the frame discarding management table 2520 to zero (S2510). After the step S2510 or if the setting in the cycle clear column 2532 is Disable (No in S2509), the processor 2300 resumes the cycle timer (S2511) and ends the process.

Sequence

Figure 26:
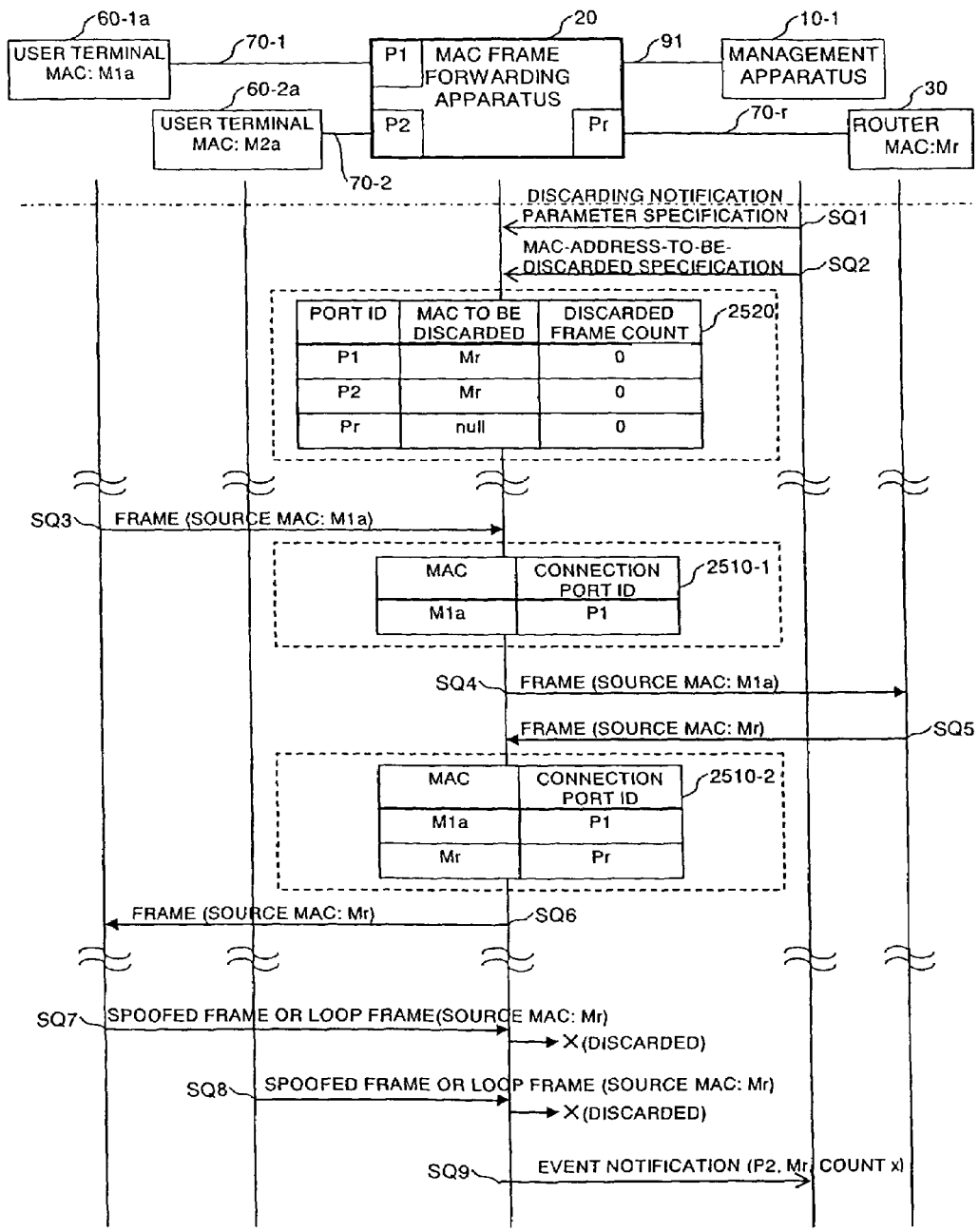
FIG. 26 shows an example sequence in the first embodiment.

FIG. 26 shows an example sequence in the first embodiment, from discarding a loop frame or a fraudulent frame until making a notification to the management apparatus 10.

The administrator that has placed the MAC frame forwarding apparatus 20 obtains the MAC address of the router 30 beforehand so that a loop frame or a fraudulent frame can be discarded. The management apparatus 10 instructs the MAC frame forwarding apparatus 20 to perform the discarding notification parameter specification process (SQ1) in step S24 and the MAC-address-to-be-discarded specification process (SQ2) in step S22. The processor 2300 in the MAC frame forwarding apparatus 20 performs the processes. The specification instructions are handled as illustrated in the flowcharts in FIGS. 8, 9, and 10. In this example sequence, when port P1 or port P2 receives a frame having the MAC address (Mr) of the router 30 as the source address, the frame is discarded. The frame discarding management table 2520 is specified as shown in FIG. 26.

In the shown example, the user terminal 60-1a sends a frame having its MAC address M1a as the source MAC address and the MAC address Mr of the router 30 as the destination MAC address (SQ3) to perform communication. The MAC frame forwarding apparatus 20 processes the received frame as illustrated in the flowcharts shown in FIGS. 6 and 7. The frame forwarding management table 2510 is specified as in the frame forwarding management table 2510-1 shown in FIG. 26, and the frame is forwarded to the router 30 (SQ4). The frame flooding may be given to apparatuses other than the router 30 in some cases.

When a response frame is returned from the router 30 (SQ5), the MAC frame forwarding apparatus 20 handles the received frame as illustrated in the flowcharts shown in FIGS. 6 and 7. The frame forwarding management table 2510 is specified as shown in the frame forwarding management table 2510-2 given in FIG. 26, and the frame is forwarded to the user terminal 60-1a (SQ6).

If the MAC frame forwarding apparatus 20 receives from the port P1 a frame having the MAC address Mr of the router 30 as the source address, by a loop frame from the user terminal 60-1a or a fraudulent (spoofed) frame (SQ7), the process as illustrated in the flowchart shown in FIG. 6 is performed. Since the frame discarding management table 2520 has the MAC address (Mr) under the port P1 as a MAC address to be discarded, the frame is discarded, and the discarded frame count in the discarded frame count column 2524 of the frame discarding management table 2520 is incremented. If the same happens on the side of the user terminal 60-2a, the frame is discarded in the same way (SQ8).

As illustrated in the flowcharts shown in FIGS. 8 and 11, the port ID, the MAC address to be discarded, the discarded frame count, and other information are reported to the management apparatus 10 (SQ9).

In the example given above, a fraudulent frame having the MAC address of the router 30 is discarded, and the fact is reported. It is also easy to discard a fraudulent frame having the MAC address of the user terminal 60 and to report the fact.

According to the first embodiment of the present invention, if the MAC address of the router 30 is specified as a MAC address to be discarded under a port other than the connection port of the router 30 in the MAC frame forwarding apparatus 20, a loop frame can be discarded when the loop frame returns to the MAC frame forwarding apparatus 20 by a loop connection made in the network on the user side. Since the loop frame is discarded before it is automatically learned in the forwarding table, the forwarding table will not be violated. The number of discarded loop frames is counted, and the number, the corresponding port ID, and the MAC addresses are reported to the management apparatus 10. Accordingly, it becomes possible to identify a fraudulent MAC address and the corresponding port ID in the MAC frame forwarding apparatus 20. Like the loop frame, spoofed frames having a false MAC address of the router 30 can be discarded in the same way.

2. Second Embodiment

Hardware Structure

The hardware structure is the same as in the first embodiment.

Memory Structure

FIG. 12 shows an example of the frame forwarding management table 2510 in a second embodiment, which is a variation of the first embodiment.

The frame forwarding management table 2510 in the second embodiment differs from the frame forwarding management table 2510 shown in FIG. 3 in the following points: An entry can be made as prescribed by the administrator from the management apparatus 10 or the like; and an aging exempt setting column 2513 is provided to protect an entry made as prescribed by the administrator from being deleted by aging. In the shown example, the aging exempt setting is '1', and the aging target setting is '0'. Here, the entries in the frame forwarding management table 2510 can be automatically added to the frame discarding management table 2520. This can reduce the load on the administrator.

In the other respects, the memory structure is the same as in the first embodiment.

Flowchart

Processes will be described in detail with reference to flowcharts.

Figure 13:
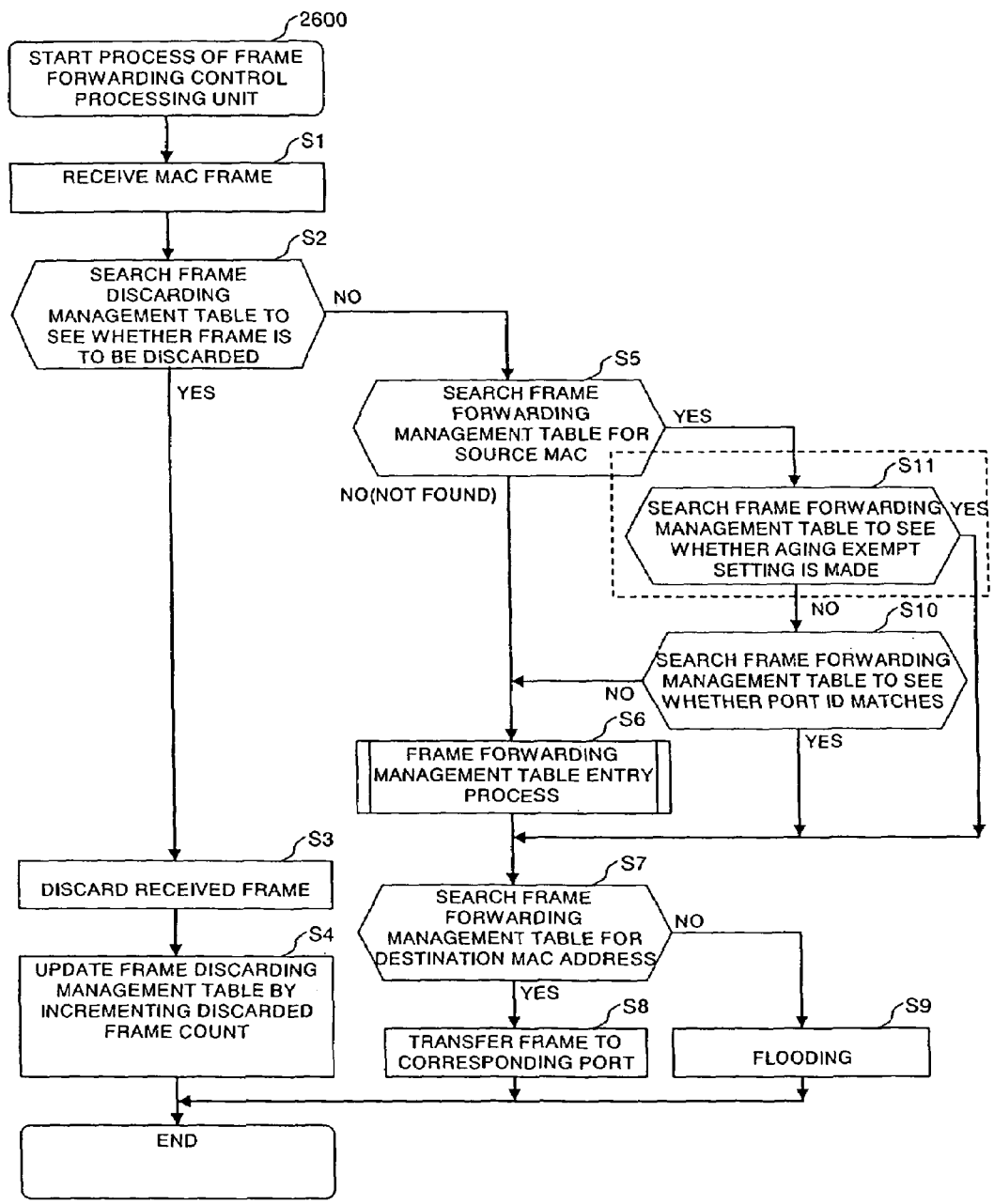
FIG. 13 is a flowchart illustrating the operation of a frame forwarding control processing unit 2600 in the second embodiment.

FIG. 13 is a flowchart illustrating an operation of the frame forwarding control processing unit 2600 in the second embodiment, which is a variation of the first embodiment.

The operation of the frame forwarding control processing unit 2600 in the second embodiment differs from that illustrated in FIG. 6 in that, if Yes in step S5, it is checked whether the aging exempt setting is made in the aging exempt setting column 2513 of the frame forwarding management table 2510 (step S11). If the aging exempt setting is found (Yes in step S11), the frame forwarding management table 2510 is not updated (overwritten). (This feature is enclosed by a broken line in FIG. 13.)

Figure 14:
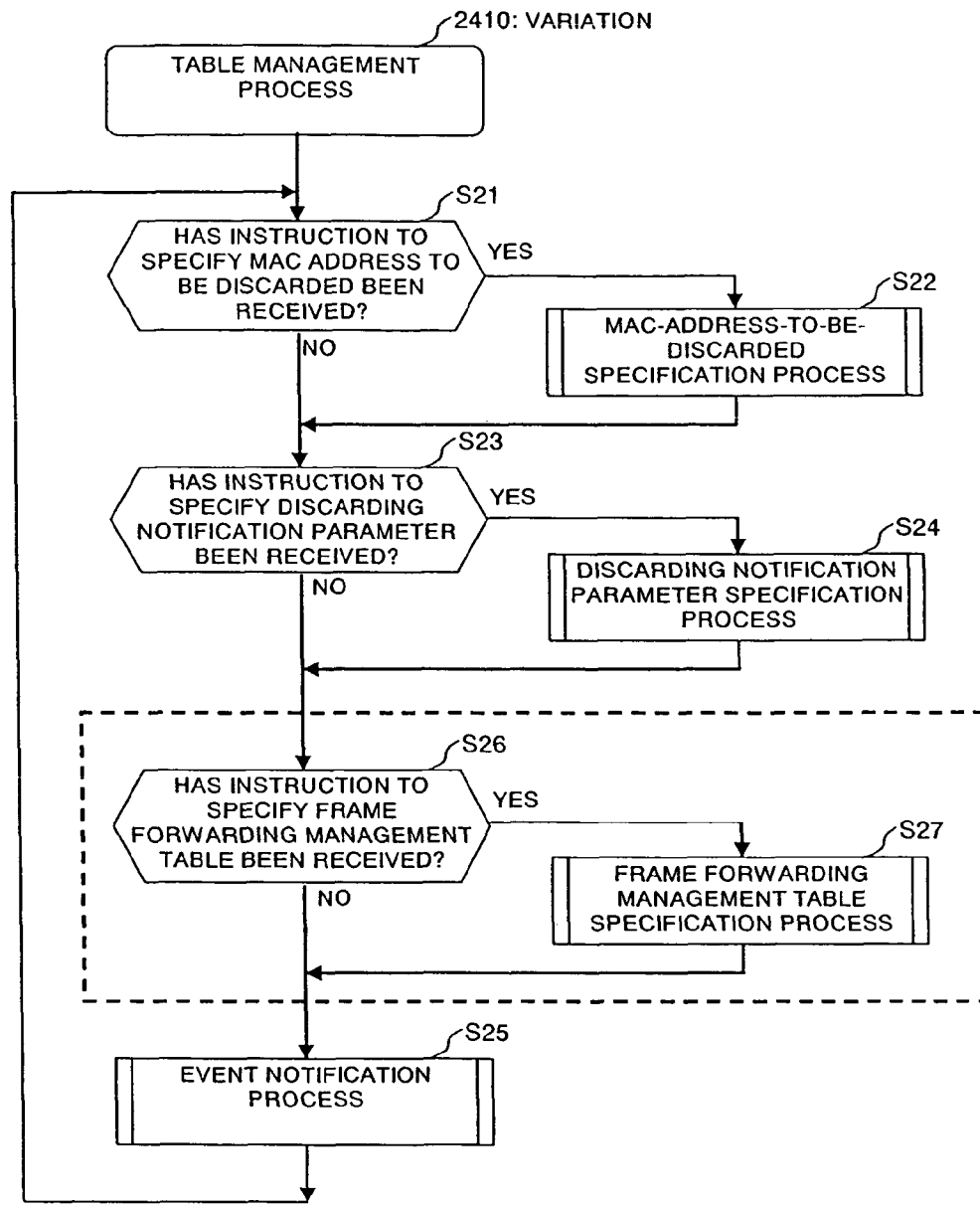
FIG. 14 is a flowchart illustrating a table management process 2410 in the second embodiment.

FIG. 14 is a flowchart illustrating the table management process 2410 in the second embodiment, which is a variation of the first embodiment.

The operation in the second embodiment differs from that illustrated in FIG. 8 in that, if No in step S23, the processor 2300 checks whether an instruction to set up the frame discarding management table has been received from the management apparatus 10 (step S26). If the instruction has been received (Yes in step S26), a frame forwarding management table specification process (S27), which will be described later, is performed. (This feature is enclosed by a broken line in FIG. 14.)

Figure 15:
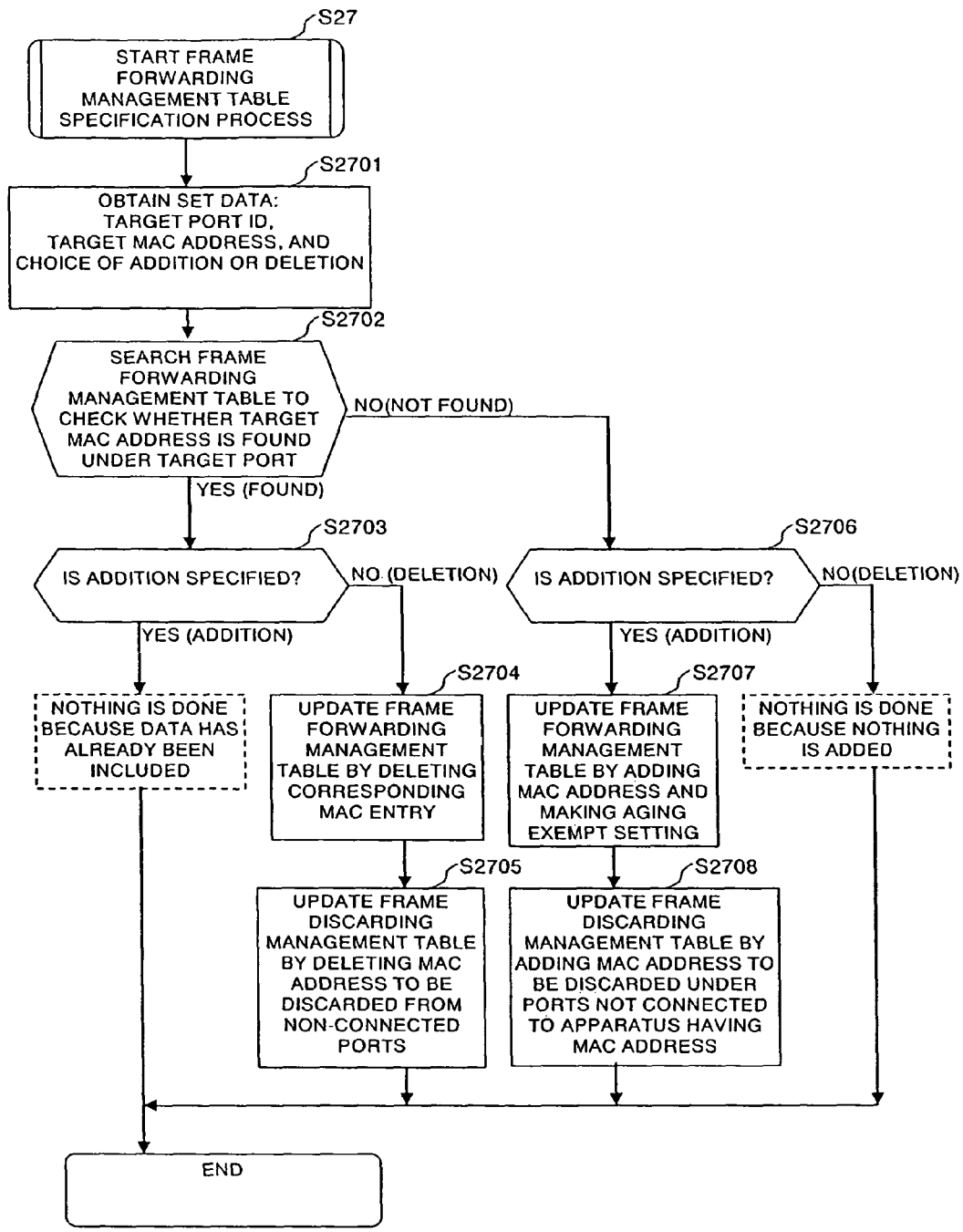
FIG. 15 is a flowchart illustrating a frame forwarding management table specification process (S27) in the second embodiment.

FIG. 15 is a flowchart illustrating the frame forwarding management table specification process (S27) in FIG. 14.

The processor 2300 starts the frame forwarding management table specification process (S27), obtains the set data, which is the target port ID, the target MAC address, and the choice of addition or deletion (S2701), and checks whether an aging exempt setting is given to the combination of the target port and the target MAC address in the MAC address column 2511 and the connection port ID column 2512 of the frame forwarding management table 2510 (S2702).

If the aging exempt setting has already be given to the MAC address (Yes in S2702), the processor 2300 checks next whether addition is specified (S2703). If addition is specified (Yes in S2703), the processor 2300 ends the process because the setting has already been added. If deletion is specified (No in S2703), the processor 2300 initializes and deletes the corresponding entry in the frame forwarding management table 2510 (S2704). The entry of the MAC address under each of the other ports is initialized and deleted from the frame discarding management table 2520 (S2705), and the process ends.

If the deletion of MAC A from the frame forwarding management table 2510 is specified in port 1 after MAC A is given the aging exempt setting in port 1 and is specified as a MAC address to be discarded in port 2, the setting of discarding MAC A in port 2 is deleted from the frame discarding management table 2520.

If the MAC address with the aging exempt setting is not found (No in S2702), the processor 2300 checks next whether addition is specified (S2706). If addition is specified (Yes in S2706), the processor 2300 adds the settings to the MAC address column 2511 and the connection port ID column 2512 of the frame forwarding management table 2510 and adds the aging exempt setting '1' to the aging exempt setting column 2513 (S2707). The processor 2300 next adds the MAC address as the MAC address to be discarded under each of the other ports in the frame discarding management table 2520 (S2708), and ends the process. If deletion is specified (No in S2706), the processor 2300 ends the process because the information has already been deleted (not added).

According to the second embodiment of the present invention, an addition to the frame forwarding management table 2510 can be made as prescribed by the administrator, and the aging exempt setting column 2513 is provided to prevent a frame added as prescribed by the administrator from being deleted by aging. For example, if the MAC address and the connection port ID of the router 30 are added to the frame forwarding management table 2510, the MAC address to be discarded is automatically set in the frame discarding management table 2520 inside the apparatus. Accordingly, the second embodiment can provide the advantages of the first embodiment and can further reduce the administration load on the administrator.

3. Third Embodiment

Hardware Structure

Figure 16:
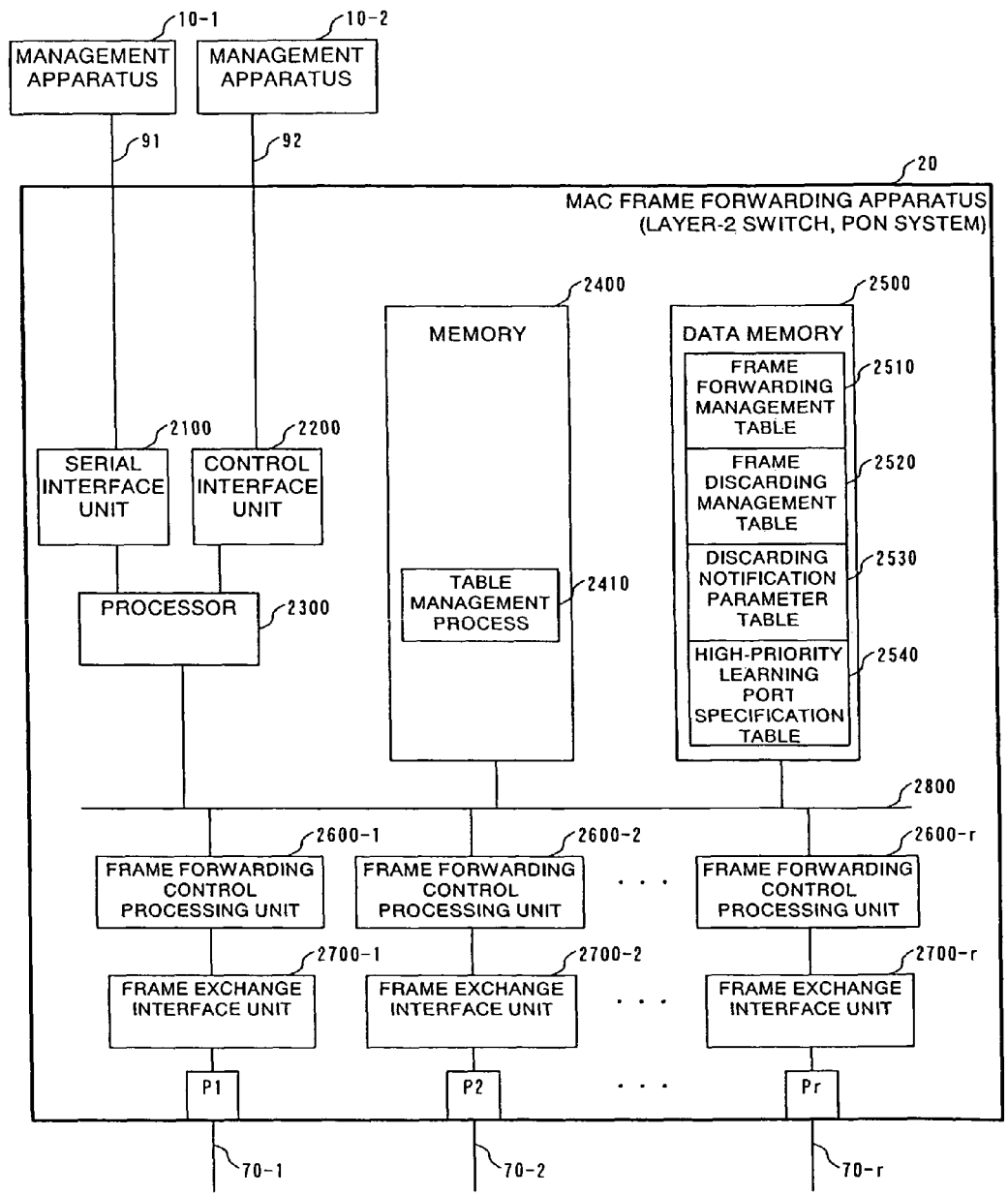
FIG. 16 shows the structure of a network system that includes a MAC frame forwarding apparatus according to a third embodiment.

FIG. 16 shows the structure of a network system that includes a MAC frame forwarding apparatus 20 according to a third embodiment of the present invention, which is a modification.

The structure of the third embodiment differs from the structure shown in FIG. 2 in that a high-priority learning port specification table 2540 is provided in a data memory 2500. "High-priority learning" in the table name means that learning at the port is prioritized to prevent spoofing. The source MAC address of a frame received from a port specified as a high-priority learning port is learned (added) with high priority. This saves the administrator from finding the MAC address of the router 30 or the like. What should be specified is just the port to which the router 30 is connected in the MAC frame forwarding apparatus 20. Accordingly, the load on the administrator can be reduced.

The other elements are the same as in the first embodiment.

Memory Structure

Figure 17:
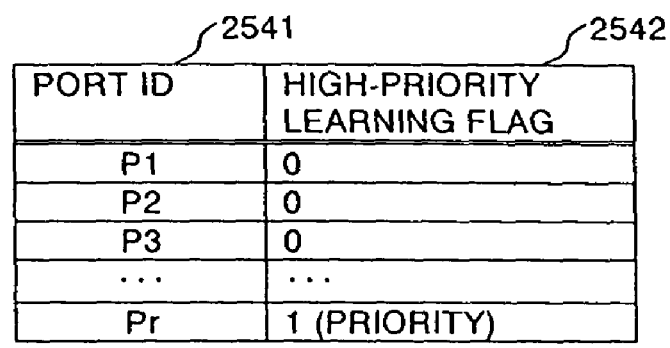
FIG. 17 shows the structure of a high-priority learning port specification table 2540 in the third embodiment.

FIG. 17 shows an example of the high-priority learning port specification table 2540 in the third embodiment.

The high-priority learning port specification table 2540 in the third embodiment specifies the ID of a high-priority learning port to be learned automatically with high priority in a frame discarding management table. In FIG. 17, the high-priority learning port specification table 2540 has a port ID column 2541 and a high-priority learning flag column 2542. The high-priority learning port settings used in the shown example are a high priority setting '1' and a non-high-priority setting '0'.

A feature of the third embodiment is that the high-priority learning flag setting for a port eliminates the need for specifying MAC addresses such as a MAC address to be discarded, from the management apparatus 10. The frame forwarding management table 2510 and the frame discarding management table 2520 can be specified automatically just by specifying a port.

The other memory components are the same as in the first embodiment.

Flowchart

The process will be described in detail with reference to flowcharts.

Figure 18:
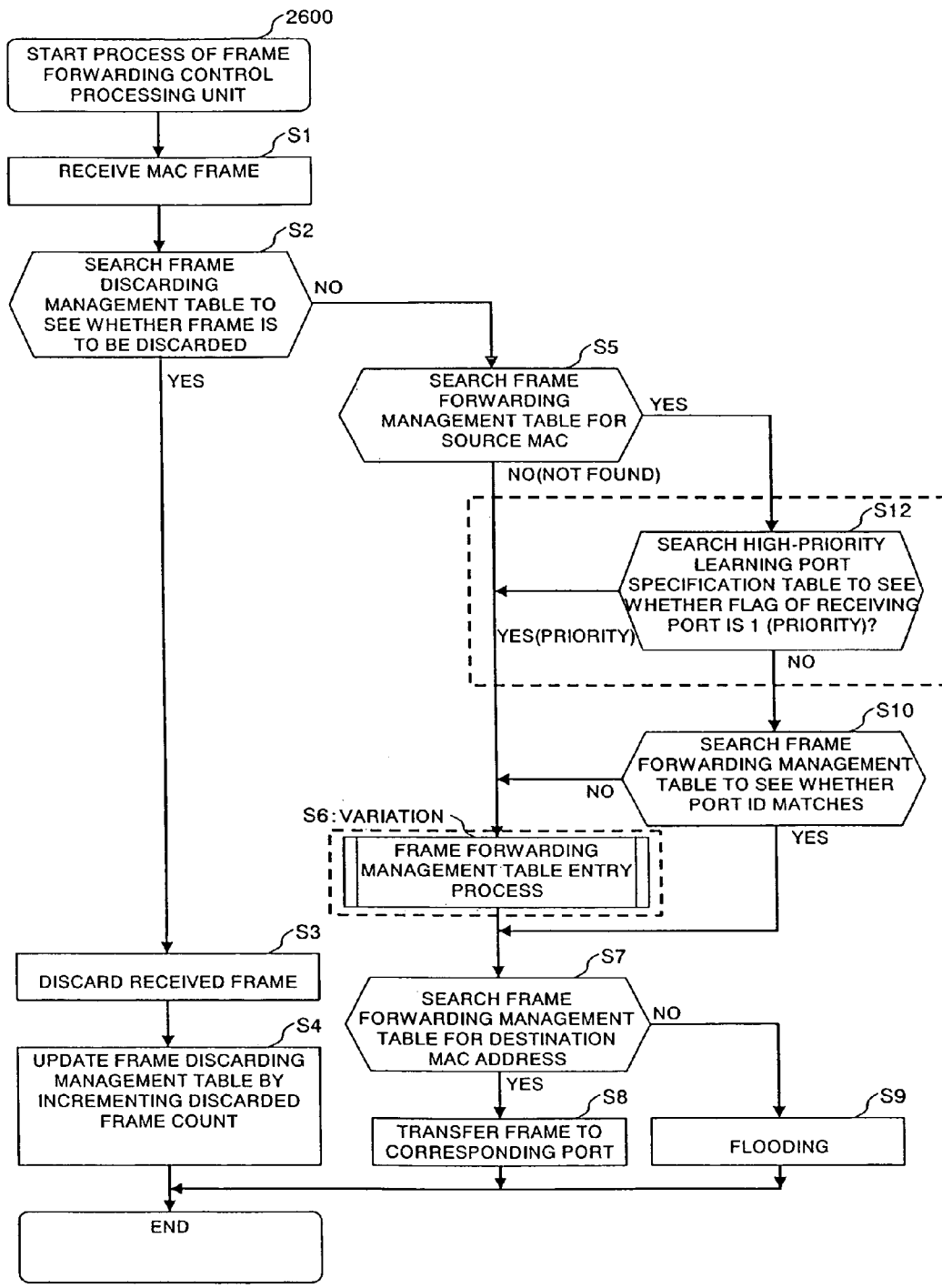
FIG. 18 is a flowchart illustrating the operation of a frame forwarding control processing unit 2600 in the third embodiment.

FIG. 18 is a flowchart illustrating an operation of the frame forwarding control processing unit 2600 in the third embodiment, which is a variation of that in the first embodiment.

The operation of the frame forwarding control processing unit 2600 in the third embodiment differs from that shown in FIG. 6 in the following points: After the judgment made in step S5 is Yes, the frame forwarding control processing unit 2600 checks whether the port ID of a received frame in the high-priority learning port specification table 2540 is specified as a high-priority port (S12). If the high-priority learning port setting is made (Yes in S12), the high-priority learning port ID is added (overwritten) to the frame discarding management table 2520 (in a variation of the frame forwarding management table entry process (S6)). (This feature is enclosed by broken lines in FIG. 18.)

Figure 19:
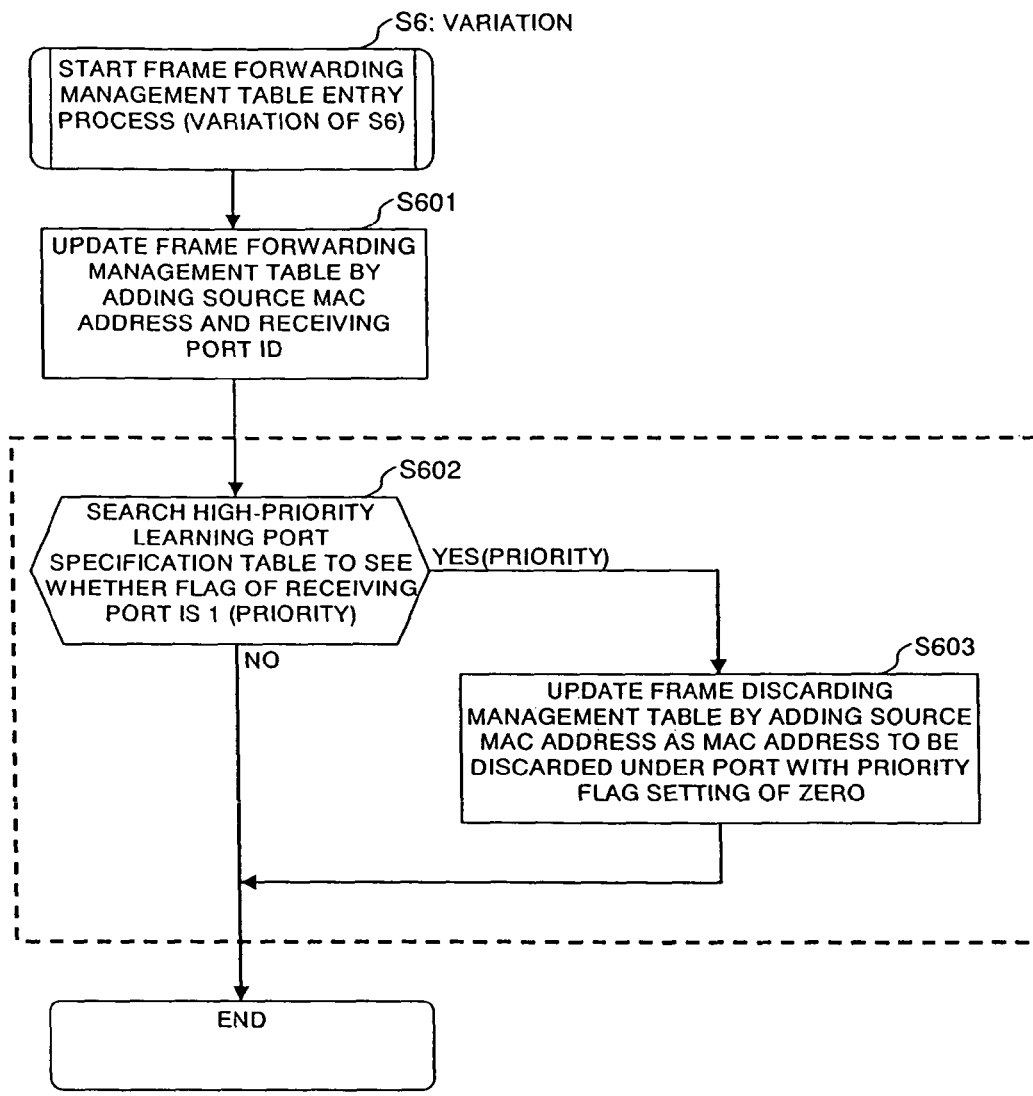
FIG. 19 is a flowchart illustrating a frame forwarding management table entry process (S6) in the third embodiment.

FIG. 19 is a flowchart illustrating a frame forwarding management table entry process (S6) in the third embodiment, which is a variation.

The process in the third embodiment differs from that illustrated in FIG. 7 in that the frame forwarding control processing unit 2600 checks after step S601 whether the port ID of a received frame in the high-priority learning port specification table 2540 is specified as a high-priority port (S602). If a non-high-priority learning port setting is given (No in S602), the process ends.

If the port is specified as a high-priority learning port (Yes in S602), the frame forwarding control processing unit 2600 searches the high-priority learning port specification table 2540 to find a non-high-priority learning port, specifies the source MAC address of the received frame as a MAC address to be discarded under the non-high-priority learning port in the frame discarding management table 2520 (S603), and ends the process.

Figure 20:
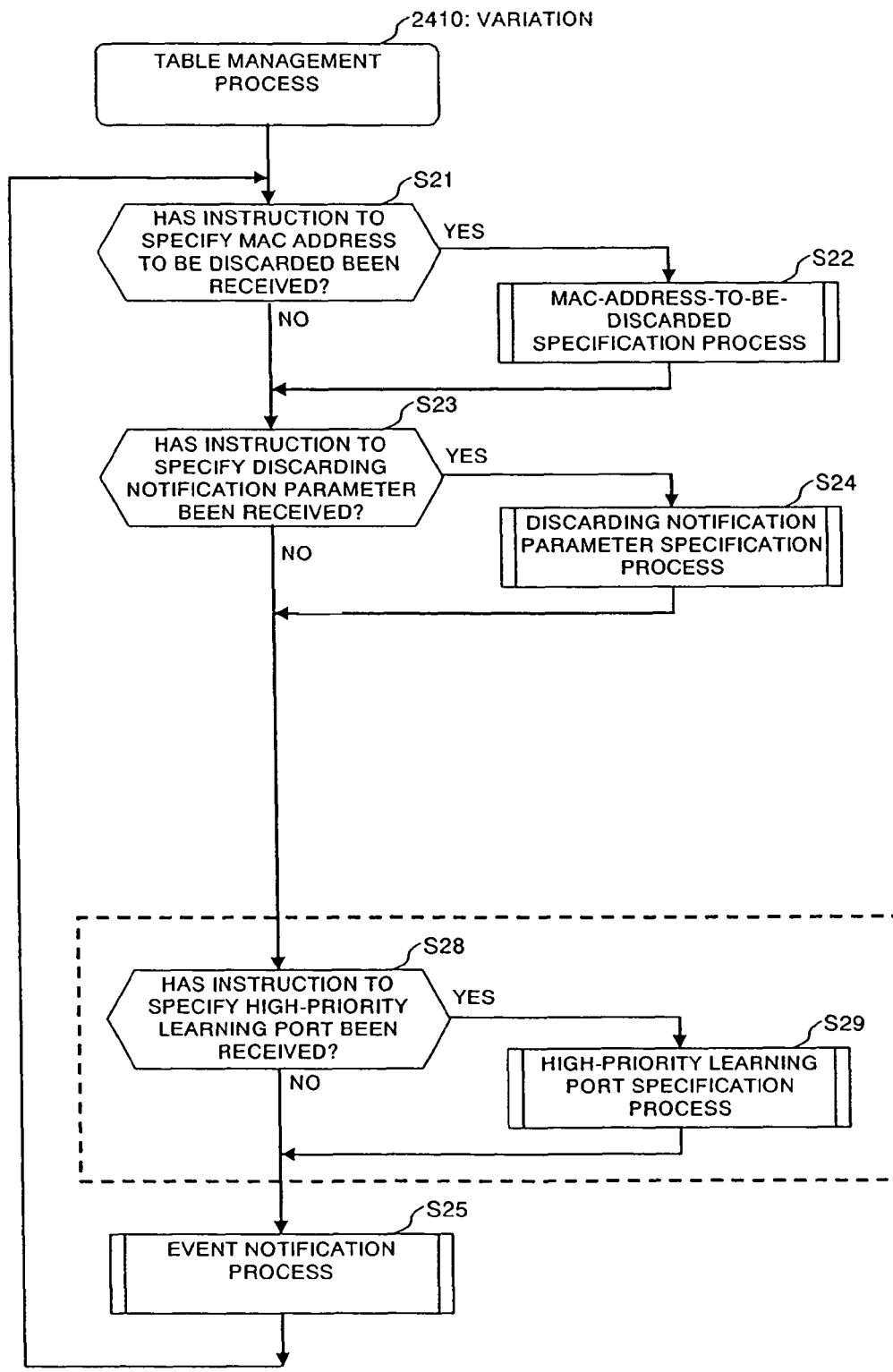
FIG. 20 is a flowchart illustrating a table management process 2410 in the third embodiment.

FIG. 20 illustrates a table management process 2410 in the third embodiment, which is a variation of that in the first embodiment.

The illustrated process of the third embodiment differs from the process shown in FIG. 8 in the following (see the part enclosed by a broken line in FIG. 20): After the judgment made in step S23 is No, it is checked whether an instruction to specify a high-priority learning port has been received from the management apparatus 10 (S28). If the instruction has been received (Yes in S28), a high-priority learning port specification process (S29), which will be described later, is performed.

Figure 21:
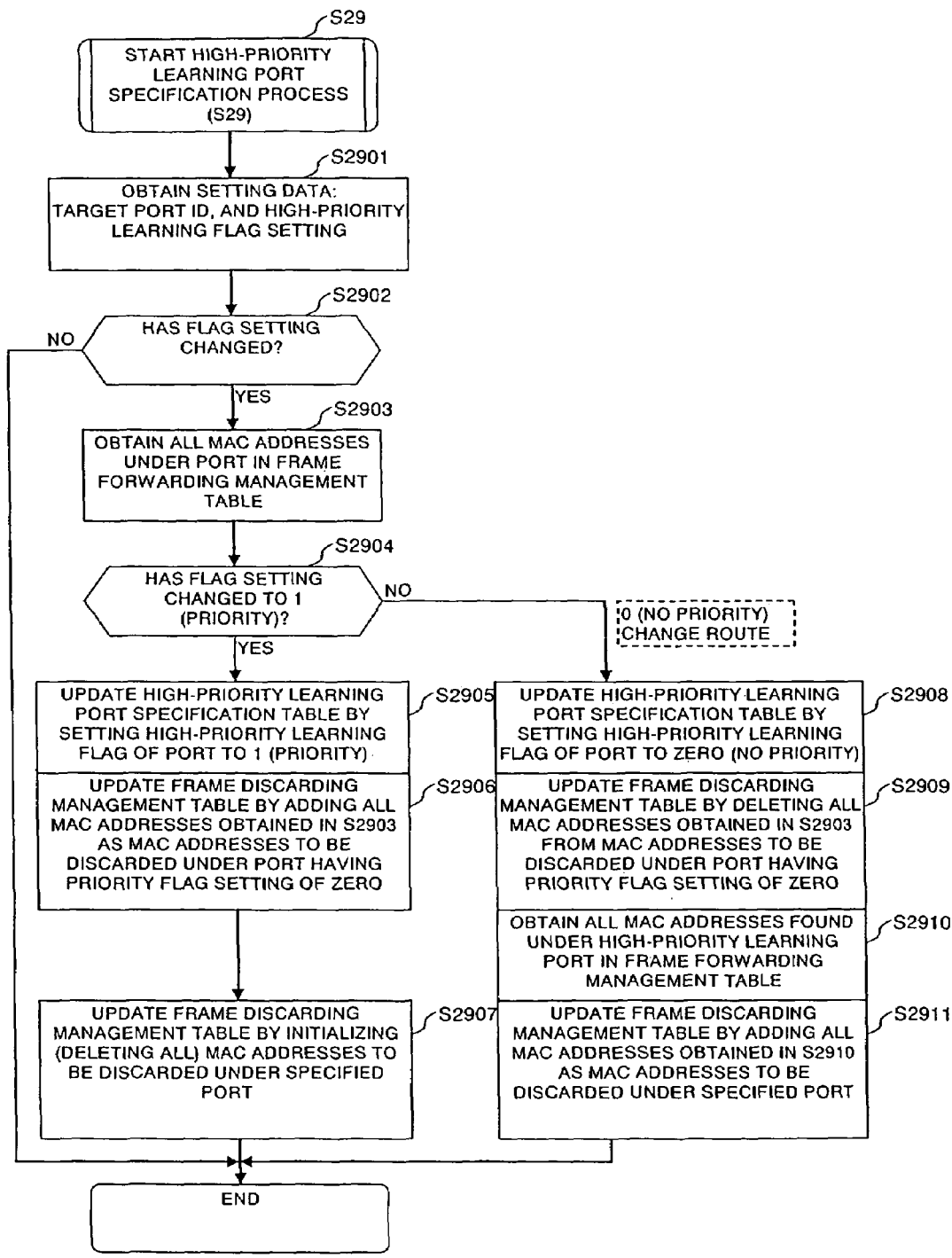
FIG. 21 is a flowchart illustrating a high-priority learning port specification process (S29) in the third embodiment.

FIG. 21 is a flowchart illustrating the high-priority learning port specification process (S29) in FIG. 20.

The processor 2300 starts the high-priority learning port specification process (S29), obtains set data, which is the target port ID and the high-priority learning flag setting (S2901), and checks whether the high-priority learning flag setting has changed (S2902). If the flag has not changed (No in S2902), the processor 2300 ends the process. If the flag has changed (Yes in S2902), the processor 2300 obtains all MAC addresses listed under the port ID, from the frame forwarding management table 2510 (S2903).

The processor 2300 next checks whether the flag setting instruction has changed to '1', that is, the high-priority learning setting (S2904). If the change is made to '1' (Yes in S2904), the processor 2300 performs steps S2905 to S2907, to discard frames having a source address that matches any MAC address listed (learned) in the port specified as a high-priority learning port, as fraudulent frames from any non-high-priority learning port. More specifically, the processor 2300 specifies '1', that is, the high-priority learning setting, in the high-priority learning flag column 2542 of the port in the high-priority learning port specification table 2540 (S2905). All the MAC addresses obtained in step S2903 are added to the MAC-address-to-be-discarded column 2523, under the non-high-priority learning ports in the frame discarding management table 2520 (S2906). The MAC addresses to be discarded are initialized (deleted) under the port for which the high-priority learning setting was made in the frame discarding management table 2520 (S2907), and the process ends.

If the setting changes to '0' (No in S2904), the processor 2300 performs steps S2908 to S2911 as a subsequent process, such as canceling the MAC address to be discarded. More specifically, the processor 2300 specifies '0', that is, the non-high-priority learning setting, under the port in the high-priority learning flag column 2542 of the high-priority learning port specification table 2540 (S2908). All the MAC addresses obtained in step S2903 are deleted from the MAC-address-to-be-discarded column 2523 under the high-priority learning port ID in the frame discarding management table 2520, and the corresponding values in the discarded frame count column 2524 are cleared to zero (S2909). The processor 2300 next obtains all MAC addresses listed under the high-priority learning port in the frame forwarding management table 2510 (S2910). All the MAC addresses obtained in step S2910 are added to the MAC-address-to-be-discarded column 2523 under the port ID specified in the frame discarding management table 2520 (S2911), and the process ends.

According to the third embodiment of the present invention, if the port ID of a port connected to the router 30 in the MAC frame forwarding apparatus 20 is added to the high-priority learning port specification table 2540 as a high-priority learning port, MAC addresses to be discarded are automatically specified in the apparatus, just by specifying the port ID, without specifying the MAC addresses in the frame discarding management table 2520 or the frame forwarding management table 2510. The third embodiment provides the advantages of the first embodiment and the second embodiment and can further reduce the management load on the administrator.

4. Fourth Embodiment

FIGS. 22, 23, and 24 show tables in a fourth embodiment, which are variations of those in the first embodiment.

In the fourth embodiment, a virtual LAN ID (VLAN-ID) is added to the tables, as additional identification information. An identifier such as the VLAN-ID can be easily added to the management based on the combination of the port and MAC. The VLAN-ID is added as a condition of data setting or judgment in the processes illustrated in the flowcharts in the first to third embodiments described above.

5. Fifth Embodiment

Hardware Structure

Figure 25:
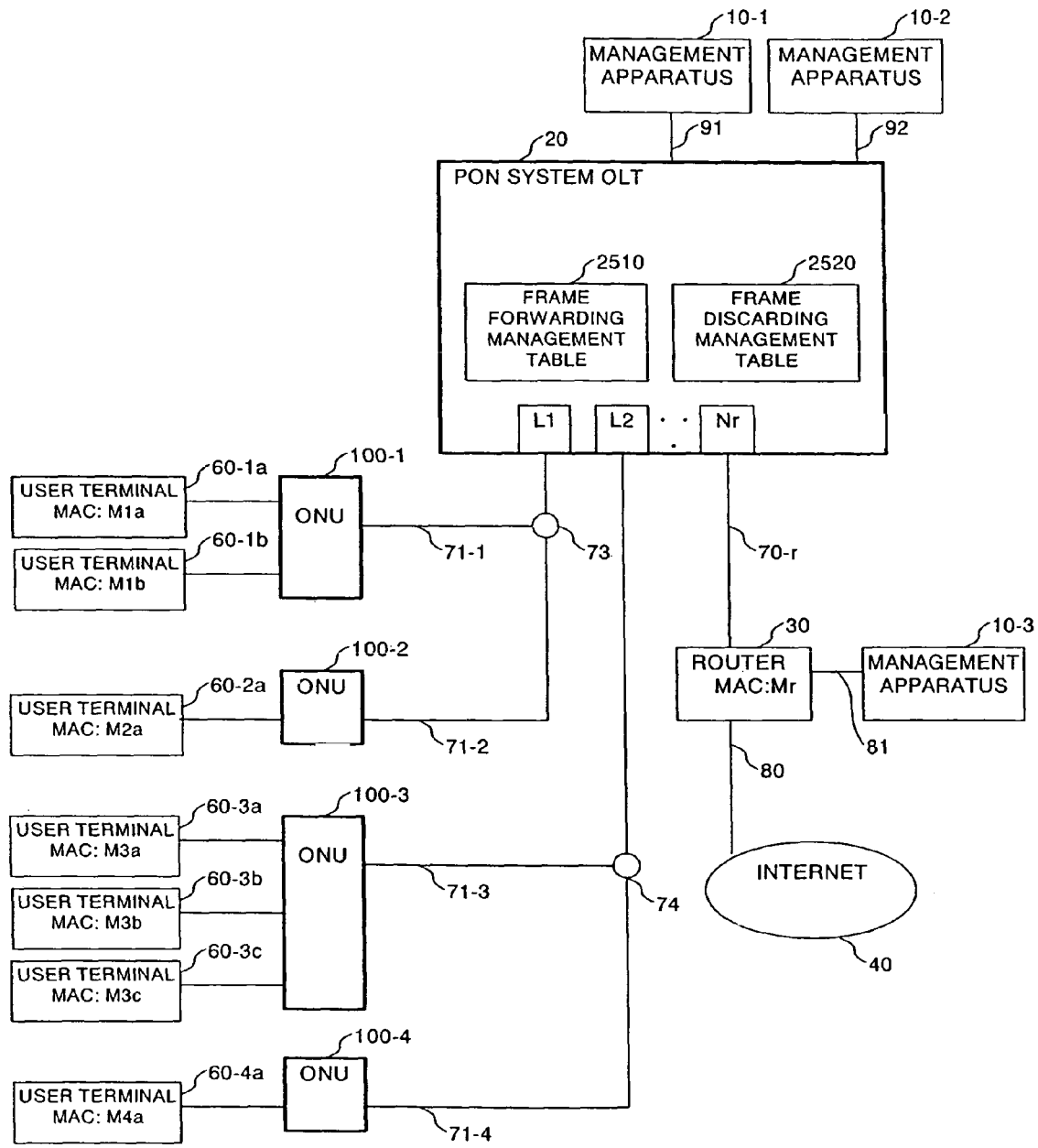
FIG. 25 shows the structure of a network system that includes a MAC frame forwarding apparatus according to a fifth embodiment.

FIG. 25 shows the structure of a network system that includes a MAC frame forwarding apparatus 20 according to a fifth embodiment of the present invention.

FIG. 25 shows the structure of a passive optical network (PON) system. Like the MAC frame forwarding apparatus 20 described earlier, the PON system OLT 20 has a frame discarding process and a process of notification to the management apparatus. ONUs 100 (100-1 to 100-4) have similar processes. The PON system OLT 20 and the ONUs 100 are connected by optical splitters 73 and 74 and optical fibers 71-1 to 71-4 in a star configuration.

The expansion to the PON system is easy as described above. In the fifth embodiment, a source ONU user network port of a fraudulent frame can be easily reported to the administrator.

The MAC frame forwarding apparatus (including a PON system) of any of the embodiments described above can discard loop frames and spoofed frames to prevent a network failure from occurring. A source port of fraud, a corresponding source MAC address, and a discarded frame count are reported to the management apparatus. This can facilitate failure analysis.

The present invention is applicable to the forwarding of IP frames and other frames as well as MAC frames. The present invention is also applicable to networks such as a PON.

What is claimed is:

1. A frame forwarding apparatus for controlling frame forwarding between each user terminal and a network, the frame forwarding apparatus comprising:
   a plurality of first interface units each accommodating an access channel connected to at least one user terminal;
   a second interface unit connected to the network;
   a frame forwarding management table which saves the address of each user terminal or a network apparatus and a connection port ID associated with the address, the connection port ID identifying the first or second interface unit connected to the terminal or the network apparatus;
   a frame discarding management table which saves an address to be discarded, a target port ID, and the number of discarded frames in association with one another, the address to be discarded indicating that a received frame having the address as a source address will be discarded;
   a frame forwarding control processing unit for receiving, forwarding, or discarding a frame with reference to the frame forwarding management table and the frame discarding management table; and
   a processor for executing a table management process for the frame forwarding management table and the frame discarding management table, as prescribed by a management apparatus;
   the frame forwarding control processing unit receiving a frame from the first or second interface unit;
   searching an address-to-be-discarded column in the frame discarding management table for the source address of the received frame;
   if the source address is found, discarding the received frame and incrementing the corresponding number of discarded frames in the frame discarding management table;
   if the source address of the received frame is not found in the address-to-be-discarded column in the frame discarding management table, searching an address column and a connection port ID column in the frame forwarding management table for a combination of the source address of the received frame and the connection port ID, and, if the combination is not found, adding the source address of the received frame and the receiving port ID to the address column and the connection port ID column of the frame forwarding management table; and
   searching the address column of the frame forwarding management table for the destination address of the received frame, if the address is found, forwarding the frame to the port found in the corresponding connection port ID field, and, if the address is not found, flooding the frame to ports except the receiving port of the received frame.

2. A frame forwarding apparatus according to claim 1, wherein the table management process executed by the processor further comprises an address-to-be-discarded specification process for obtaining setting data that includes the target port ID, the address to be discarded, and a choice of addition or deletion, from the management apparatus, and updating the frame discarding management table accordingly.

3. A frame forwarding apparatus according to claim 1, further comprising:
   a discarding notification parameter table which has a discarded frame count monitoring cycle column where a cycle for monitoring the frame discarding management table is specified, a cycle clear column where a choice indicating whether the number of discarded frames in the frame discarding management table is cleared in each monitoring cycle is specified, and a discarded frame count threshold column;
   the processor further executing an event notification process for notifying the management apparatus of an event concerning a discarded frame;
   the event notification process comprising the steps of:
     searching the frame discarding management table, if the cycle expires while a cycle timer is running or if the cycle timer is at rest; and
     if there is an entry having a discarded frame count reaching the discarded frame count threshold in the discarding notification parameter table or more, reporting the port ID, the address to be discarded, and the discarded frame count in the corresponding entry of the frame discarding management table to the management apparatus, and
     clearing the corresponding discarded frame count field in the frame discarding management table.

4. A frame forwarding apparatus according to claim 3, wherein the processor further references the discarded frame count monitoring cycle column of the discarding notification parameter table;
   if either zero seconds or no monitoring depending on a temporal cycle is specified, terminates the process;
   if neither zero seconds nor no monitoring depending on a temporal cycle is specified, checks a setting in the cycle clear column of the discarding notification parameter table;
   if the setting in the cycle clear column is Enable, clears all the discarded frame count fields in the frame discarding management table to zero, and resumes the cycle timer; and
   if the setting in the cycle clear column is Disable, resumes the cycle timer and ends the process.

5. A frame forwarding apparatus according to claim 3, wherein the table management process executed by the processor further comprises a discarding notification parameter specification process for obtaining setting data that includes a discarded frame count monitoring cycle, a cycle clear setting, and a discarded frame count threshold from the management apparatus and specifying the data in the discarding notification parameter table as prescribed.

6. A frame forwarding apparatus according to claim 1, wherein the frame forwarding management table further comprises an aging exempt setting column where a setting indicating whether a frame that is not accessed for a predetermined period of time is subjected to aging and deleted or not is specified for an address and the connection port ID;
   the frame forwarding control processing unit checking whether an aging exempt setting is made in the aging exempt setting column of the frame forwarding management table, if the source address is found in the frame forwarding management table and,
   if the aging exempt setting is found, not overwriting or updating the frame forwarding management table or not making an addition to the table.

7. A frame forwarding apparatus according to claim 6, wherein the processor obtains a target port ID, a target address, and a choice of addition or deletion as setting data, from the management apparatus;
   checks whether an aging exempt setting is given to the combination of the target port and the target address in the address column and the connection port ID column of the frame forwarding management table;
   (1) if the aging exempt setting is given to the combination of the address and the connection port ID,
   if addition is specified, ends the process since the data has already been specified,
   if deletion is specified, initializes and deletes the corresponding fields in the frame forwarding management table and initializes and deletes the corresponding entry of the other port ID or port IDs in the frame discarding management table;
   (2) if the aging exempt setting is not given to the combination of the address and the connection port ID,
   if addition is specified, adds the address and the connection port ID to the address column and the connection port ID column of the frame forwarding management table, gives an aging exempt setting in the aging exempt setting column, and adds the address as an address to be discarded to the other port IDs in the frame discarding management table.

8. A frame forwarding apparatus according to claim 1, further comprising:
   a high-priority learning port specification table which has a port ID column and a high-priority port specification column disposed to make a high-priority entry, in association with each other;
   the frame forwarding control processing unit checking whether a high-priority port setting is given to the port ID of the received frame in the high-priority learning port specification table if the source address of the received frame is not found in the address column of the frame forwarding management table, and if the high-priority learning port setting is given, specifying the source address of the received frame as an address to be discarded, for a non-high-priority learning port in the frame discarding management table, and ending the process.

9. A frame forwarding apparatus according to claim 8, wherein, if the processor receives an instruction to make a high-priority learning port setting from the management apparatus, the processor obtains the target port ID and the high-priority learning flag setting as setting data from the management apparatus, and, if the high-priority learning flag setting has changed, the processor obtains all addresses specified under the port ID in the frame forwarding management table;
   (1) if the flag setting instruction changes to a high-priority learning setting, the processor changes the setting of the port in the high-priority-learning flag column in the high-priority learning port specification table to a high-priority learning setting, adds all the obtained addresses to the address-to-be-discarded field of a non-high-priority learning port in the frame discarding management table, and deletes all the addresses to be discarded from the port ID having a high-priority learning setting in the frame discarding management table; and (2) if the flag setting instruction changes to a non-high-priority learning setting, the processor changes the setting of the port in the high-priority-learning flag column of the high-priority learning port specification table to a non-high-priority learning setting, deletes all the obtained addresses of the high-priority learning port ID in the frame discarding management table from the address-to-be-discarded column, clears the discarded frame count column, obtains all addresses specified under a high-priority learning port in the frame forwarding management table, and adds the all the obtained addresses to the address-to-be-discarded field under the port ID specified in the frame discarding management table.

10. A frame forwarding apparatus according to claim 1, wherein the frame forwarding management table and the frame discarding management table further include VLAN-ID as identification information.

* * * * *